(12) United States Patent
Van Dyke

(10) Patent No.: US 11,593,476 B2
(45) Date of Patent: Feb. 28, 2023

(54) DATA BREACH SCORE AND METHOD

(71) Applicant: Breach Clarity, Inc., Pleasanton, CA (US)

(72) Inventor: James Van Dyke, Pleasanton, CA (US)

(73) Assignee: Sontiq, Inc., Nottingham, MD (US)

( * ) Notice: Subject to any disclaimer, the term of this patent is extended or adjusted under 35 U.S.C. 154(b) by 114 days.

(21) Appl. No.: 16/638,046

(22) PCT Filed: Aug. 21, 2018

(86) PCT No.: PCT/US2018/047237
§ 371 (c)(1),
(2) Date: Feb. 10, 2020

(87) PCT Pub. No.: WO2019/040443
PCT Pub. Date: Feb. 28, 2019

(65) Prior Publication Data
US 2020/0193018 A1    Jun. 18, 2020

Related U.S. Application Data

(60) Provisional application No. 62/548,656, filed on Aug. 22, 2017.

(51) Int. Cl.
*G06F 21/55* (2013.01)
*G06F 21/62* (2013.01)

(52) U.S. Cl.
CPC ........ *G06F 21/552* (2013.01); *G06F 21/6245* (2013.01); *G06F 2221/034* (2013.01)

(58) Field of Classification Search
CPC ...... G06F 21/55; G06F 21/552; G06F 21/554; G06F 21/6245; G06F 2221/034
See application file for complete search history.

(56) References Cited

U.S. PATENT DOCUMENTS 10,313,342 B1   6/2019  Caldwell
11,288,359 B1   3/2022  Caldwell
(Continued)

FOREIGN PATENT DOCUMENTS

WO    2016018289 A1    2/2016

OTHER PUBLICATIONS

Kanoun et al., "Elementary Risks: Bridging Operational and Strategic Security Realms", 2015 11th International Conference on Signal-Image Technology & Internet-Based Systems, 2015, p. 278-286, IEEE, 2015.
(Continued)

*Primary Examiner* — Daniel B Potratz
*Assistant Examiner* — D'Arcy Winston Straub
(74) *Attorney, Agent, or Firm* — Quinn IP Law

(57) ABSTRACT

Assessing a consumer's risk of harms related to a data breach includes determining, for the particular data breach, a data breach score, referred to as a Breach Clarity™ (BC) score, indicative of the risk of harm related to the particular breach. A data structure pairs a breached information element with at least one potential harm. Algorithms assign a harm risk score to the harm, determine an element risk score for the information element-harm pair, and determine a BC score using the harm risk and element risk scores, and an exposure rating. The BC score can be modified by a scaling algorithm to generate a relative BC score. The system identifies and rank orders mitigation actions for the breach and outputs these with the BC score to the consumer. A consumer's demographic and/or behavioral characteristics can be factored into the exposure rating and ranking of the mitigation actions.

18 Claims, 21 Drawing Sheets

(56) References Cited

U.S. PATENT DOCUMENTS

| | | |
|---|---|---|
| 2013/0091574 A1* | 4/2013 | Howes .................. G06F 21/554 |
| | | 726/25 |
| 2015/0073981 A1 | 3/2015 | Adjaoute |
| 2015/0222654 A1 | 8/2015 | Crowley et al. |
| 2016/0234247 A1 | 8/2016 | Ng et al. |
| 2017/0161520 A1* | 6/2017 | Lockhart, III ...... G06F 21/6263 |
| 2017/0161746 A1* | 6/2017 | Cook ........................ H04L 9/14 |
| 2017/0195310 A1 | 7/2017 | Tyler et al. |
| 2017/0213037 A1 | 7/2017 | Toledano et al. |
| 2018/0026996 A1 | 1/2018 | Park et al. |
| 2018/0183827 A1* | 6/2018 | Zorlular .................. H04L 41/06 |

OTHER PUBLICATIONS

International Search Report for international application No. PCT/US2018/047237.

* cited by examiner

| Company Suffering a Data Breach: | Social Security Number | Date of Birth | Birthplace | Passport # | Credit Report | Tax ID | Employer | Wage Info | Email Address | Email Password | Payment Cardholder name | Payment Card number | Card expiration date | Card CVV code | Card PIN | Medical Account number | Medical diagnosis | Medical procedures | Medical prescriptions | Home Address | Name (with other PII) | (Additional fields continue...) |
|---|---|---|---|---|---|---|---|---|---|---|---|---|---|---|---|---|---|---|---|---|---|---|
| AAA Accounting Breach | X | X | - | - | X | X | X | - | - | - | - | - | - | - | - | - | - | - | - | - | - | ... |
| ABC Corp Breach | - | - | - | - | - | - | - | - | - | - | X | X | X | X | X | - | - | - | - | - | - | ... |
| Able Company Breach | - | - | - | - | - | - | - | - | - | - | X | X | - | - | - | - | - | - | - | - | - | ... |
| Accucare Health Breach | X | - | - | - | - | - | - | - | - | - | - | - | - | - | - | X | X | X | - | X | - | ... |
| ACME Health Breach | - | - | X | - | - | - | - | - | - | - | - | - | - | - | - | X | - | - | - | - | X | ... |
| Azure Jewelers Breach | X | - | - | - | - | - | - | - | X | - | - | - | - | - | - | - | - | - | - | - | - | ... |
| ...etc. | - | - | - | - | - | - | - | - | - | - | - | - | - | - | - | - | - | - | - | - | - | ... |

In the example, the underlying machine-readable database records that the breach at 'Azure Jewelers' exposed consumer PII in the form of Social security numbers and email addresses. When a consumer uses the BC Score to determine the severity, risks and recommendations for a breach of their personal data at 'Azure Jewelers', the algorithm converts the particular named breach into a formula that primarily considers what types of harms are most strongly enabled by SSN and email address exposure (as illustrated in the table shown in FIG. 4).

FIG. 3

82 Consumer inputs or selects name of breach (for example, 'Azure Jewelers') in BC User Interface (UI)

84 BC system uses proprietary, pre-populated database of breaches to convert 'Azure Jewelers' into facts that are material to the data breach (for example, 'Social Security number and email address' was compromised)

86 BC system accesses its proprietary database populated with risk-profile scores (that were produced from proprietary research) for any PII field that could be compromised in a breach. (Note: this database may also contain risk-profile scores for other facts commonly known about breaches, such as compromise method or verified existence of breached data available for sale in online criminal marketplaces.)

88 Using the risk-profile scores retrieved for the hypothetical Azure Jewelers example, BC computes predicted risk of both particular identity-related harms (as shown on left of table shown in FIG. 6) and total risk across all harms (as show in bottom row of table in FIG. 6)

*FIG. 5*

| Examples of Harms (Fraud or Other Misuse Type) | Risk of a harm from Social Security # compromise | | Risk of a harm from Email address compromise | | For the PII that was compromised the total risk of a particular harm occurring is the following: | Comments: |
|---|---|---|---|---|---|---|
| Tax Refund | 10 | + | 6 | = | 16 | Highest predicted risk for this breach |
| New Account Creation | 10 | + | 5 | = | 15 | Second highest predicted risk |
| Existing Payment Card Account fraud | 3 | + | 3 | = | 6 | |
| Existing non-Card Financial Account fraud | 6 | + | 3 | = | 9 | |
| Existing non-Financial fraud | 6 | + | 2 | = | 8 | |
| Privacy Violations | 6 | + | 4 | = | 10 | This harm is the third-likeliest to occur (tied with harm listed below) |
| Legal Action | 9 | + | 0 | = | 9 | |
| Employment Verification Fraud | 8 | + | 2 | = | 10 | This harm is the third-likeliest to occur (tied with harm listed above) |
| Breach Clarity Score (total predicted level of risk): | | | | | 83 | |

*FIG. 6*

| Action Type → | Set fraud alerts | Freeze credit | Reissue payment card | Notify banks, etc. of breach | Setup 2-factor verification | Change affected passwords | File your taxes ASAP | Request an IRS Pin | Report lost/stolen ID to agency | Lookout for social engineering | Buy new account monitoring | Add advanced account controls | Buy P2P network scanning | Monitor account activity | Setup account activity alerts | Get free credit reports | (Additional fields continue...) |
|---|---|---|---|---|---|---|---|---|---|---|---|---|---|---|---|---|---|
| Examples of Harms (Fraud or Other Misuse Type): | | | | | | | | | | | | | | | | | |
| Tax Refund | 0 | 0 | 0 | 0 | 0 | 6 | 12 | 12 | 0 | 3 | 0 | 3 | 1.5 | 0 | 7 | 7 | ... |
| New Account Creation | 10 | 7 | 0 | 3 | 2.5 | 4 | 0 | 0 | 2 | 2 | 0 | 0 | 0 | 0 | 9 | 9 | ... |
| Existing Payment Card Account | 1 | 0 | 10 | 10 | 4 | 0 | 0 | 0 | 9 | 10 | 10 | 10 | 0 | 0 | 10 | 9 | ... |
| Existing non-Card Financial Account | 3 | 0 | 0 | 8 | 4 | 9 | 0 | 0 | 0 | 5 | 2 | 3 | 2 | 5 | 8 | 6 | ... |
| Existing non-Financial Account | 8 | 0 | 0 | 1 | 2 | 7 | 0 | 0 | 0 | 3 | 0 | 2 | 0 | 3 | 4 | 0 | ... |
| Medical or Privacy | 2 | 1 | 0 | 1 | 7 | 0 | 1 | 0 | 8 | 4 | 0 | 0 | 0 | 5 | 4 | 0 | ... |
| Legal Action | 0 | 0 | 0 | 0 | 0 | 0 | 0 | 0 | 0 | 8 | 0 | 0 | 0 | 0 | 0 | 0 | ... |
| Government Benefits | 2 | 1 | 0 | 0 | 6 | 9 | 3 | 0 | 9 | 5 | 0 | 0 | 0 | 4 | 4 | 0 | ... |
| ...etc. | ... | ... | ... | ... | ... | ... | ... | ... | ... | ... | ... | ... | ... | ... | ... | ... | ... |

*FIG. 11*

DATA BREACH SCORE AND METHOD

CROSS-REFERENCE TO RELATED APPLICATIONS

This application claims priority to and the benefit of U.S. Provisional Patent Application No. 62/548,656, filed on Aug. 22, 2017, which is hereby incorporated by reference in its entirety.

TECHNICAL FIELD

The present disclosure pertains to a method and system for determining a consumer's risk of harm including identify theft resulting from a data breach or data compromise.

BACKGROUND

Data breaches and data compromises are very different from one another with regard to both total relative risk and the specific nature of that risk to a consumer-victim of the breach, and as a result require prioritized and unique action steps be taken by a consumer-victim in response to notification of a breach or compromise of the consumer-victim's data. Presently, data breach victims only have access to overly-broad fraud-protection advice or solutions, which can include inappropriate advice or solutions. The advice available to a data breach victim can be a distraction because it may not be possible for even the most qualified individual human advice-giver to compute recommendations that precisely mine, e.g., include and reflect, the expertise of a wide range of fraud-prevention and identity-protection experts.

SUMMARY

A method and system for assessing a data breach and providing recommendations for mitigation actions to reduce a consumer's risk of identity theft or other harms, following notification that the consumer has been exposed to risk as a result of a particular data breach or compromise, is described herein. The term "data breach" as used herein is not to be limiting, and is to be construed broadly to comprise any incident in which data has been exposed in a manner which creates a possibility or potential for harm, hurt, loss and/or injury to the data owner, including, for example, identity theft, financial loss, loss of privacy, extortion, etc. A "data breach" as that term is used herein, may also be referred to, and/or comprise, one or more of a data theft, data compromise, unauthorized data access, unauthorized data exposure, a data hack, a data intrusion, a data penetration, physical lost or stolen personally identifiable information, etc. A "data breach" may also be referred to herein as a "data compromise" and/or as a "breach event." The system described herein, which can be described as a data breach scoring system or application, includes a plurality of data structures, tabulation formats, quantitative and qualitative research, and algorithms that are used in combination to compute risk-related outputs designed to minimize risk for consumers, all of which can be outputted to a consumer via a user interface (UI). In an illustrative example, the system described herein is referred to as the Breach Clarity™ (BC) system. One output of the BC system is an overall risk score generated for a specific breach victim, which is also referred to herein as a Breach Clarity™ (BC) score. The BC score can be generated, using one or more algorithms, and outputted as an absolute value and/or as a relative value, e.g., relative to a predetermined scale. In one example, the BC score is generated as a relative numeric value between 0 and an upper limit (such as 10, 50 or 100), where the upper limit represents a relative maximum risk created by any particular breach of a victim's information elements. In an illustrative example, the information elements which can be breached and/or compromised can include one or more of personally identifiable information (PII), protected health information (PHI), payment card industry (PCI) data, and other such information which can, if breached and/or compromised, expose the breached victim to risk, injury, and/or harm.

Another computer-generated output of the BC system described herein is a prioritized list of particular harms (such as tax refund fraud or existing credit card fraud) that are generated by an algorithm as the most likely, e.g., most probable, harms which can occur as a result of a particular breach event or combination or breach events, based on the unique characteristics of that particular breach or that particular combination of breach events. Another BC system output is an element risk score for a harm associated with a breached information element, where the element risk score is generated using one or more algorithms applied to data associated in a data structure, and/or industry research including qualitative, quantitative and non-quantitative research, and stored in a data structure of the BC system. The element risk scores for information elements breached in a data breach event can be combined using an algorithm to derive the overall BC score for a breach event. Yet another output generated by the BC system using the data structure is a prioritized list of particular consumer fraud-mitigation action steps, which can include, for example, actions such as obtaining a credit freeze, setting a fraud alert, initiating credit monitoring, etc. that are ranked to generate an action set prioritized to identify the relatively strongest protective actions against the identified risks and harms. The outputs generated by the BC system are presented, e.g., displayed and/or outputted, to the consumer-victim via a user interface designed in one example, such that the consumer can view a consolidated display showing a BC score, identified risks, mitigation actions, and in one example, can action the mitigation actions and/or additional information via the user interface. This consolidation of outputs presented for the consumer's viewing and use presents an advantage to the consumer, in contrast with ad-hoc, unconsolidated, unprioritized, and/or generalized consumer data breach information which may not clearly identify to the consumer the severity of a breach action and/or the appropriate mitigation actions which should be taken in response.

The BC system described herein includes an apparatus, comprising a computing device having a processor and a non-transitory memory, the non-transitory memory storing instructions executable by the processor such that the apparatus is configured and/or operable to execute a method described herein which can also be referred to as a Breach Clarity™ (BC) process, or BC method. In an illustrative example, the method can include populating, via a server, a data structure with breach information, where the breach information can include a plurality of information elements and a plurality of harms. Each information element of the plurality of information elements is paired in the data structure with each harm of the plurality of harms to generate a plurality of information element-harm data pairs. The method includes generating, using an algorithm, an element risk score for each respective information element-harm pair of the plurality of information element-harm data pairs, and associating, in the data structure, the element risk score with the respective information element-harm data pair.

The data breach information can include a breach event descriptor which identifies a breach event, and at least one breached information element, where the at least one breached information element is a respective information element of the plurality of information elements which has been compromised by the breach event. The method can include receiving, via the server, the breach event descriptor and the at least one breached information element, and associating, in the data structure, the breach event descriptor with the at least one breached information element. The method can include associating, using the data structure, each information element-harm pair of the plurality of information element-harm data pairs which includes the at least one breached information element with the breach event descriptor.

In one example, the method includes generating, using the algorithm, a harm risk score for the respective harm of each information element-harm data pair associated with the breach event descriptor, associating, using the data structure, the harm risk score for each harm with the breach event descriptor, and storing in the data structure the harm risk score associated with the breach event descriptor. The method can include generating, using the algorithm, a data breach score for the breach event, where generating the data breach score includes summing the harm risk scores of the respective harms of each information element-harm data pair associated with the breach event descriptor to generate the data breach score. In one example, the data breach score is calculated by the algorithm as an absolute value. In another example, the data breach score is calculated by the algorithm as a relative value, where the relative value can be generated using the algorithm, by applying at least one of a scaling factor and a modifier to the data breach score. The method can include generating, using the algorithm, an exposure rating for the breach event, and associating, in the data structure, the exposure rating with the breach event descriptor.

The method can include outputting, via the server, the data breach score to a user interface, where the user interface can be in communication with the server. In one example, the method includes generating, using the algorithm, at least one mitigation action for mitigating the at least one harm associated with the breach event descriptor, and outputting the at least one harm and the at least one mitigation action to the user interface. The method can include associating, in the data structure, the at least one mitigation action with the at least one harm to form a harm-mitigation action data pair, and determining, using the algorithm, a prioritization factor for the harm-mitigation action data pair. The at least one mitigation action can include a plurality of mitigation actions, such that the method can include determining, using the algorithm, a respective prioritization factor for each respective mitigation action of the plurality of mitigation actions, and associating, in the data structure, the respective prioritization factor with each respective mitigation action. In one example, the method includes compiling, using the algorithm, a listing of the plurality of mitigation actions, where each respective mitigation action is ordered in the listing according to the respective prioritization factor associated with the respective mitigation action. The method can include associating, in the data structure, a user interface with the at least one mitigation action, where the user interface is actuatable to initiate the at least one mitigation action. The user interface can be provided, via the server, to a user device, such that a user can access the BC system via the user device.

The above noted and other features and advantages of the present disclosure are readily apparent from the following detailed description when taken in connection with the accompanying drawings.

BRIEF DESCRIPTION OF THE DRAWINGS

FIG. 3 is a schematic illustration of an exemplary data table relating a listing of breached entities and a listing of breachable information elements;

FIG. 5 is a schematic illustration of a flowchart of an exemplary method for generating risk scores for a particular breach event;

FIG. 6. is a schematic illustration of an exemplary data table showing the risk outputs generated by the method of FIG. 5;

FIG. 11 is a schematic illustration of an exemplary data table showing a listing of harms, a listing of mitigation actions, and an exemplary action priority factor generated by an algorithm of the system of FIG. 1 for each harm-mitigation action combination;

DETAILED DESCRIPTION

Figure 1:
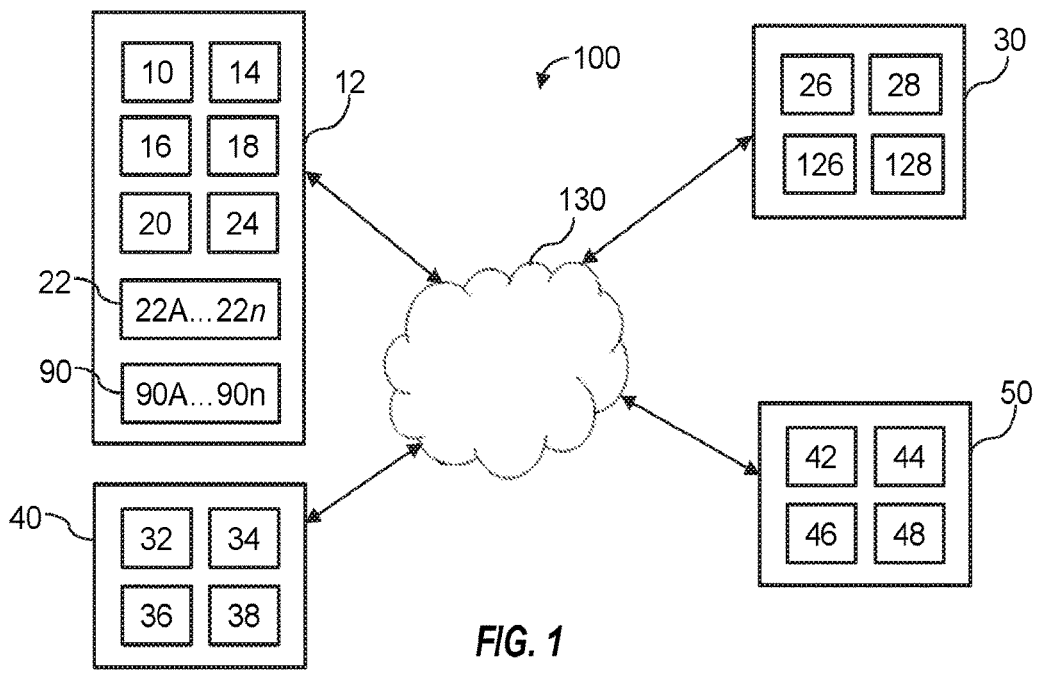
FIG. 1 is a is a schematic illustration of an exemplary Breach Clarity™ (BC) system for generating risk-related outputs related to a breach event.

A method and system for assessing a data breach and providing recommendations for mitigation actions to reduce a consumer's risk of identity theft or other harms, following awareness and/or notification that the consumer has been exposed to risk as a result of a particular data breach or compromise of one or more of the consumer's information elements, is described herein. In an illustrative non-limiting example, the information elements which can be breached and/or compromised can include one or more of personally identifiable information (PII), protected health information (PHI), payment card industry (PCI) data, and other such information which can, if breached and/or compromised, expose the breached victim to risk, injury, and/or harm. A consumer which has been the victim of a data breach can be referred to herein as a consumer, a consumer-victim, and/or as a victim. The term "data breach" as used herein is not to be limiting, and is to be construed broadly to comprise any incident in which data has been exposed in a manner which creates a possibility or potential for harm, hurt, loss and/or injury to the data owner, including, for example, identity theft, financial loss, loss of privacy, etc. A "data breach" as that term is used herein, may also be referred to, and/or comprise, one or more of a data theft, data compromise, unauthorized data access, unauthorized data exposure, a data hack, a data intrusion, a data penetration, etc. A "data breach" may also be referred to herein as a "data compromise," a "data compromise event", and/or as a "breach event."

Referring to the drawings wherein like reference numbers represent like components throughout the several figures, the elements shown in FIGS. 1-23 are not necessarily to scale or proportion. Accordingly, the particular dimensions and applications provided in the drawings presented herein are not to be considered limiting. As used herein, the terms "a," "an," "the," "at least one," and "one or more" are interchangeable and indicate that at least one of an item is present. A plurality of such items may be present unless the context clearly indicates otherwise. All numerical values of parameters, quantities, or conditions in this disclosure, including the appended claims, are to be understood as being modified in all instances by the term "about" or "approximately" whether or not "about" or "approximately" actually appears before the numerical value. "About" and "approximately" indicate that the stated numerical value allows some slight imprecision (e.g., with some approach to exactness in the value; reasonably close to the value; nearly; essentially) If the imprecision provided by "about" or "approximately" is not otherwise understood with this meaning, then "about" and "approximately" as used herein indicate at least variations that may arise from methods of measuring and using such parameters. Further, the terminology "substantially" also refers to a slight imprecision of a condition (e.g., with some approach to exactness of the condition; approximately or reasonably close to the condition; nearly; essentially). In addition, disclosed numerical ranges include disclosure of all values and further divided ranges within the entire disclosed range. Each value within a range and the endpoints of a range are all disclosed as separate embodiments. The terms "comprising," "includes," "including," "has," and "having" are inclusive and therefore specify the presence of stated items, but do not preclude the presence of other items. As used in this disclosure, the term "or" includes any and all combinations of one or more of the listed items.

Referring to FIG. 1, a system, which can be described herein as a data breach scoring system, is generally indicated at 100. In an illustrative example, the system 100 is also referred to herein as a Breach Clarity™ (BC) system, and/or as a BC system 100. The BC system 100 includes a BC server 12, which includes one or more data structures generally indicated at 22 (see also FIGS. 3, 4, 6, 11), and one or more algorithms 10 configured to compute risk-related outputs designed to minimize risk for consumers which have been the victim of a breach event 70 (see FIG. 3). The risk to a consumer as a result of a data breach can also be referred to herein as a harm or as an injury, such that the terms risk, harm, and injury are to be broadly construed to include all types of damage to the consumer which can result from a data breach, including but not limited to the harms 72 described herein and shown in the figures. Each of the risk-related outputs can be generated by the BC system 100 for each breach event 70, and/or as a summary output for a plurality of breach events 70 experienced by a consumer-victim, where the latter is shown in a non-limiting example illustrated by FIG. 23. A breach event 70 can also be identified herein by a breach descriptor, e.g, by a name or description by which the breach event 70 is identified. The risk-related outputs can include, in an illustrative example and described in further detail herein, one or more breach descriptors 70 (see FIGS. 3, 9, 13-23), a set of breachable information elements 68 (see FIGS. 3 and 4), one or more of a set of harm descriptors 72 (see FIGS. 4, 5 and 11), an exemplary element risk score 74 (see FIG. 4) generated for each combination-pair of a breachable information element 68 and a harm descriptor 72, an exemplary harm risk score 76 (see FIG. 6) generated for each harm descriptor 72 considering all information elements 68 breached in a particular breach event 70, an exposure rating 132, an overall data breach score 80 also referred to herein as a Breach Clarity™ (BC) score 80 (see FIGS. 6 and 8) generated for the particular breach event 70.

As shown in FIG. 1, the BC server 12 includes a memory 16 and a central processing unit (CPU) 14. The memory 16 of the BC server 12 can include, by way of example, Read Only Memory (ROM), Random Access Memory (RAM), electrically-erasable programmable read only memory (EEPROM), etc., i.e., non-transient/tangible machine memory of a size and speed sufficient for storing the data structure 22, the algorithms 10, tabulation formats included in the data structure 22, such as the data tables 22A, 22B, 22C, 22D shown respectively in FIGS. 3, 4, 6 and 11, quantitative, qualitative and other industry and/or breach related research, breach event data, mitigation action information, one or more BC applications 20, etc. The memory 16 is of a size and speed sufficient for manipulating the data structure 22, for executing algorithms 10 and/or BC applications 20 to generate the risk-related outputs, and to generate one or more user interfaces (UI) 90 including for example, user interfaces 90A-90E shown in the figures. The BC server includes a BC interface 18, which in an illustrative example can be configured as a modem, browser, or similar means suitable for accessing a network 130. In one example, the network 130 is the internet. The BC server 12, in a non-limiting example, is administered and/or operated by a BC service provider. In one example, a consumer-victim can access the risk-outputs and other services of the BC system 100 via a user device 30 and/or by personal contact with the BC service provider.

A consumer, also referred to herein as a consumer, can access the BC system 100, for example, via a user device 30, to view breach information including risk outputs generated by the BC system 100 for one or more breach events 70. In one example, the consumer accessing the BC system 100 can be a consumer-victim of a breach event 70 accessing the BC system 100 to view information outputted by the BC system 100 related to that breach event 70. In another example, the consumer is not required to be a victim of a breach 70, e.g., any consumer can access the BC system 100 to view breach information, including the risk outputs generated by the BC system 100 for one or more breach events 70. In one example, the BC system 100 can be configured such that a consumer is not required to input identifying information, and/or to identify themselves as a victim of a breach event 70 as a prerequisite to accessing the BC system 100. In another example, the BC system 100 is configured to provide an option to a consumer to subscribe to the BC system 100, such that subscription information for the subscriber-consumer can be stored in the memory 16 of the BC server 12 in the data structure 22, for example, in a consumer profile created in the data structure 22 for the subscriber-consumer. The term "subscription" is intended to have a broad meaning including, for example, one or more actions such as creating an account, creating a log-in name and password, enrolling and/or registering as a user of the BC system 100 and/or to receive notifications from the BC system 100, creating a consumer profile, etc. The term "subscription" can include, but is not limited to, a subscription whereby the subscriber is assessed a fee for accessing the BC system 100. In one example a consumer can subscribe without payment of a subscription fee. In another example, the BC system 100 and/or a subscription to the BC system 100 can be offered to consumer by a sponsor or other entity, such as a resource provider which may be financial organization, commercial entity, or health services organization In one example, the sponsoring and/or other entity can host a portal to the BC system 100 on the sponsor/other entity's website, through which a consumer can access the BC system 100.

In a non-limiting example, the subscriber-consumer's subscription information and/or the subscriber-consumer's consumer profile is associated in the data structure 22 at least with each breach event 70 in which the subscriber-consumer has been a known victim, and with each of the subscriber-consumer's information elements 68 which has been breached or compromised. The consumer profile can also be referred to herein as a consumer risk profile and/or as a subscriber risk profile. During the subscription process, the subscriber-consumer may input to the BC system 100 information elements 68 of the subscriber-consumer which have compromised and/or breached which are not associated with a publicly reported breach, for example, theft of credit card information from a stolen purse or wallet, loss of payment information by skimming, improper disposal of personal information records, etc. In a non-limiting example, the subscription information for a subscriber-consumer can include identifying information for identifying the subscriber-consumer including for example, the subscriber-consumer's name, address, e-mail address, phone, other social media contact information (Twitter®, Instagram®, etc.), a listing of the breach events 70 in which the subscriber-consumer has been victimized including the number, type, frequency and timing of each of these breach events 70, a listing of the subscriber-consumer's information elements 68 which have been breached or compromised by the breach events 70 in which the subscriber-consumer has been victimized, actual harm or injury incurred by the subscriber-consumer due to a data breach or compromise, behavioral and/or demographic-based information for the subscriber-consumer which, in one example, can be used by the BC system 100 and/or the algorithms 10 to generate, rank, weight, and/or otherwise prioritize mitigation actions 116 which can outputted to the subscriber-consumer. In this latter example, behavioral information can include, by way of non-limiting example, the subscriber-consumer's information security behaviors including for example, password behaviors including reuse of passwords, frequency of changing passwords, password security messages used by the subscriber-consumer, the subscriber-consumer's use of anti-virus, security, anti-malware products, the subscriber-consumer's use of identity theft tools such as credit score monitoring, the subscriber-consumer's frequency and breadth of on-line communication methods (private and public networks including Wi-Fi, e-mail, chat rooms, blogs, social media, instant messaging, etc.), the subscriber-consumer's frequency and breadth of on-line use and/or communication of PII personally identifiable information (PII), protected health information (PHI), payment card industry (PCI) data, including on-line accessing and manipulation of this information, the subscriber-consumer's data access mechanisms including the type, model, etc. of devices (mobile phones, personal computers, personal digital assistants, tablets, lap tops, modems, routers, smart appliances, smart home devices and systems, smart vehicles, etc.) used by the subscriber-consumer, etc. In this latter example, demographic information can include, by way of non-limiting example, the subscriber-consumer's geographic location, income demographic, age, gender, marital status, occupation, etc. One or more algorithms of the BC system 100 can be configured to incorporate the subscriber-consumer's subscription information in generating one or more of the risk outputs, for example, in generating an exposure rating 132, a listing of recommended mitigation actions 116, a rank ordering of harms 72, etc., where the subscription information can be used by the algorithm as a modifier and/or additional factor in the calculation and/or generation of the risk outputs by the BC server 12. The example of using subscriber information in the calculation and/or generation of the risk outputs is illustrative and non-limiting. For example, one or more algorithms of the BC system 100 can be configured to associate, in the data structure 22, a non-subscribing consumer's identifying information, with one or more of the breach events 70, breached information elements 68, etc., in generating one or more of the risk outputs, for example, in generating an exposure rating 132, a listing of recommended mitigation actions 116, a rank ordering of harms 72, etc., where the consumer information can be used by the algorithm as a modifier and/or additional factor in the calculation and/or generation of the risk outputs by the BC server 12.

The user device 30 includes a memory 26, a central processing unit (CPU) 28, one or more user applications 24, a communications interface 126, and an input/output interface 128. The user device 30 may be a user device such as a mobile phone, a personal digital assistant (PDAs), a handheld or portable device (iPhone, Blackberry, etc.), a notebook, personal computer, note pad or other user device configured for mobile communications, including communication with network 130. The user device 30 is configured to communicate with the network 130 through the communications interface 126, which may be a modem, mobile browser, wireless internet browser or similar means suitable for accessing network 130. The memory 26 of the user device 30 can include, by way of example, Read Only Memory (ROM), Random Access Memory (RAM), electrically-erasable programmable read only memory (EEPROM), etc., i.e., non-transient/tangible machine memory of a size and speed sufficient for executing a BC application 20 which may be activated on user device 30 including, for example, one or more user interfaces 90, and/or for executing mitigation actions 116, as described in further detail herein. The input/output interface 128 of the user device 30 can include, for example, one or more of a keypad and display, a touch screen, or a combination thereof configurable to output and/or display, for example, one or more user interfaces 90 associated with one or more BC applications 20, and/or to display content received by the user device 30 from the BC server 12, a reporting server 40, and/or a resource server 50, including for example, webpages, images, information selected for output via the input/output interface 128 and/or a user interface 90 of the user device 30. Illustrative examples of user interfaces 90 which can be generated by and outputted from the BC system 100 are included in the figures, and shown as user interfaces 90A, 90B, 90C, 90D, 90E, 90F, 90G, 90H, 90J, 90K, 90L, 90M, 90N, 90P, 90Q, 90R, and 90S. These examples are non-limiting, and it would be understood that other configurations and/or arrangements of the risk outputs generated by the BC system 100 could be displayed via one or more user interfaces 90 other than those shown in the figures for illustration.

The system 100 can include one or more reporting servers 40 configured and/or operable to report information related to a data breach, which can include, for example, a breach descriptor 70 of the breached entity, such as a company name (for example, "Azure Jewelers" or "XYZ Bank"), breach event information including date(s) breached, information elements 68 breached and/or compromised by the breach (personally identifiable information (PII), protected health information (PHI), payment card industry (PCI) data, etc.), information relating to the breaching entity (hacker, criminal, etc.), post-breach exposure and/or use of the breached data (availability for sale in online criminal marketplaces), etc. Each of the reporting servers 40 is administered and/or operated by a reporting entity which is reporting a breach event. The reporting entity administering a reporting server 40 can be, by way of example, a breached entity reporting information related to a breach of its own data, a regulatory or government organization configured to receive information from breached entities and/or to report the information to consumer-victims, a financial institution, a government organization, a health organization, a retail entity, etc. reporting breaches of its respective data, etc. The BC system 100 collects breach event information, for example, via communication between the BC server 12 and one or more of the reporting servers 40, for use in generating the BC risk-related outputs described herein. In an illustrative example, the reporting server 40 includes a memory 32 and a central processing unit (CPU) 34. The memory 32 of the reporting server 40 can include, by way of example, Read Only Memory (ROM), Random Access Memory (RAM), electrically-erasable programmable read only memory (EEPROM), etc., i.e., non-transient/tangible machine memory of a size and speed sufficient for storing breach event information collected by the reporting entity related to a breach event 70 in a reporting database 36. The memory 32 is of a size and speed sufficient for the manipulation and reporting out of the breach event information by the reporting entity administrating the reporting server 40. In an illustrative example, the BC server 12 receives breach information regarding a breach event 70 at the time the breach is initially reported, and can continue to receive information periodically thereafter regarding the breach event 70, such that the breach information related to the breach event 70 can be periodically updated in the data structure 22 as additional breach information is learned and/or becomes available. In one example, the BC server 12 receives exposure information and/or accesses exposure information stored in the data structure 22, and uses an algorithm 10 to assign an initial exposure rating 132 (see FIGS. 19-23) to each breach event 70, where the exposure rating 132 indicates to the consumer of the likelihood of exposure of their data from that breach event 70. The exposure information can include, for example, information received from the breached entity regarding the extent to which the breached information elements 68 have been exposed, e.g., distributed in an unauthorized manner, the types of exposures which have occurred and/or are anticipated to occur, for example, exposure of the breached information elements 68 via a network, website, by unauthorized publication, etc., qualitative and/or quantitative research related to exposure patterns for breaches and/or breached data similar to the breach event 70, etc. The exposure rating 132 can be a relative number, for example, on a scale having an upper limit. In the example shown in FIGS. 19-23, the exposure rating 132 is expressed as a relative number on a scale from 1 to 10, with an exposure rating 132 of "10" corresponding to the most severe rating, e.g., the relatively highest likelihood of data exposure from that breach event 10, and an exposure rating 132 of "1" corresponding to the least sever rating, e.g., the relatively lowest likelihood of data exposure from that breach event 10. The BC server 12 can continue to monitor and/or receive breach information periodically after occurrence of each particular breach event 70, related to the observed availability of the breached data (for that particular breach event 70) in unauthorized sites, e.g., in unauthorized circulation. In one example, the BC server 12 receives breach information as to the observed availability of the breached data on "dark" web sites, on the darknet, or other through other sources including non-network locations, including, for example, the availability of the breached data for sale or other distribution for unauthorized uses. The BC server 12 and/or algorithms 10, in response to the breach information as to the observed availability of the breached data, can, for example, modify the exposure rating 132, re-rank mitigation actions 116, and/or modify the likelihood of harm, e.g., the risk distribution 134 (see FIGS. 15-23) of the risks associated with that particular breach event 70.

The reporting server 40 includes a reporting interface 38, which in an illustrative example can be configured as a modem, browser, or similar means suitable for accessing a network 130. In one example, the BC server 12 collects breach event information from the one or more reporting servers 40 via the network 130 and stores the collected breach event information within the BC memory 16 and/or data structure 22 for use in generating the BC risk-related outputs using BC algorithms 10 and/or applications 20. The BC data structure 22 can include one or more data-mapping tables, functions, and/or BC applications 20 for mediating the importation of data from a reporting server 40 and/or reporting database 36, include BC applications 20 for mapping data fields from a particular reporting database 40 to the corresponding fields in the BC data structure 22. The BC data structure 22 can include a plurality of data-mapping applications, where each application can be configured for a specific reporting database 36, to improve the efficiency and effectiveness of data importation and consolidation into the BC data structure 22 from multiple reporting databases 36 administrated by multiple reporting entities. For example, the BC data structure 22 can include a first data mapping application for mediating the importation of data from a first reporting database 36 administrated by a government regulatory agency receiving reports of data breach events 70 from various types of organizations (banks, brokerages, etc.) in the financial industry, a second data mapping application for mediating the importation of data from a retail entity which has experience a data breach event 70, a third data mapping application for mediating the importation of breached data reported by an individual consumer (see FIG. 10), a fourth data mapping application for mediating the importation of breached data reported by a medical institution, and so on. As such, the BC data structure 22 and the BC method for generating risk outputs provides a standardized database of breach information and an efficient and standardized approach to quantifying the risks and harms 72 to a consumer-victim associated with a data breach event 70, for that breach event 70 and relative to other breach events 70.

The system 100 can include one or more resource servers 50 configured to provide resources, including mitigation actions 116 (see FIG. 8), to consumer-victims of a data breach. Each of the resource servers 50 is administered and/or operated by a resource provider. A resource provider can be, by way of non-limiting example, a financial institution such as a bank or brokerage providing a notification service to a consumer-victim subjected to a breach of the financial institution customer's information, a credit bureau or similar organization monitoring the consumer-victim's account for fraud and/or identify theft detection, a provider of identity protection software, and/or the breached entity for example, to change a password or other breached information such as a payment card account number, etc. In an illustrative example, the resource server 50 includes a memory 42 and a central processing unit (CPU) 44. The memory 42 of the resource server 50 can include, by way of example, Read Only Memory (ROM), Random Access Memory (RAM), electrically-erasable programmable read only memory (EEPROM), etc., i.e., non-transient/tangible machine memory of a size and speed sufficient for the providing resource services, which can include mitigation actions 16, related to the breach event and/or breached information, which can be stored and/or accessed via a resource database 46. The resource server 50 includes a resource interface 48, which in an illustrative example can be configured as a modem, browser, website, or similar means suitable for accessing a network 130. In an illustrative example, the resource server 50 can be accessed via a user interface 90 provided by the BC system to a consumer-victim's user device 30, to activate a mitigation action 116. In one example, the resource server 50 and the BC server 12 are integrated via one or more application programming interfaces (APIs) such that one or more mitigation actions 116 can be automatically activated on a consumer's accounts based on breach status information and the consumer's and/or the resource provider's preferences. By way of illustration, the resource server 50 can be an administrator of a consumer-specific account, such as a financial, healthcare, or other account including sensitive and/or private information (PII), where the administrative functions of the resource server 60 include consumer-specific account customization of alerts, threshold limits for transfers and other activities, etc., based on the consumer and/or resource provider's input and/or preferences. The BC server 12, in the present example, can be integrated with the resource server 50, for example, a banking institution or healthcare provider, such that the consumer-specific account settings can be made automatically based on the consumer's risk profile determined by the BC server 12. In one example, the integration of the BC server 12 with the resource server 50 for consumer-specific account customization can occur during a subscription process, during which the consumer subscribes to the BC system 100 and authorizes the integration and automatic updating of the resource provider's consumer-specific account settings by the BC server 12 based on the subscriber-consumer's BC risk profile. As changes occur in the consumer's risk profile in the BC server 12 over time, for example, as a consumer becomes a victim of a breach event 70 for which a harm 72 and/or a mitigation action 116 is identified by the BC system 100 related to the consumer-specific account administered by the resource server 50 and integrated with the BC server 12, the BC server 12 via the integration API automatically changes settings on the consumer-specific account, for example, to revise alert settings, change authorization thresholds, notify the integrated resource provider of breach information potentially affecting the consumer-specific account administered by the resource server 50, etc.

In another illustrative example, the resource server 50 can incorporate a third-party source of breach status information or other details, such as IDtheftcenter.org, a credit reporting agency, an activity monitoring system for monitoring online activity related to a consumer's online accounts, email addresses, etc. such as www.havelbeenpwnd.com, a breached entity's own site established to for a consumer to obtain breach information from that breached entity such as the site https://trustedidpremier.com/eligibility/eiligibility.html established for victims of the Equifax breach event. In this example, the resource server 50 can be integrated with the BC server 12, via an API or like system, such that the resource server 50 can automatically provide breach information to the BC server 12. In one example, the BC system 100 is operable and/or configured such that, when breach information related to a consumer-specific account is received by the BC server 12 from an integrated resource server 50, the BC server 12 updates the consumer's BC risk profile, including recommended mitigation actions 116, exposure ratings 132, and the like, and automatically provides notifications to the affected consumer.

In the example shown in FIG. 1, the BC server 12, the user device 30, the reporting server 40, and the resource server 50 can selectively communicate with each other via the network 130. The example shown in FIG. 1 is non-limiting, such that one or more of the BC server 12, user device 30, reporting server 40, resource server 50 could be selectively connected directly, for example, to directly access each other, and/or for off-network communication of data between one or more of the BC server 12, user device 30, reporting server 40, resource server 50. The example shown in FIG. 1 is non-limiting, such that a consumer-victim could contact a BC provider having access to the BC server 12 using means other than a user device 30, for example using one or more of in-person contact, telephone, facsimile, short message service (SMS), multimedia messaging service (MMS), written (mailed) correspondence, etc., to obtain the services and risk-outputs provided by the BC system 100 and/or the BC server 12. Similarly, a consumer-victim could contact a resource provider having access to the resource server 50 to obtain resource services which can include actioning one or more mitigation actions 116 (see FIG. 8) and/or could contact a reporting provider having access to the reporting server 40 to obtain reporting services which can including determining whether the consumer has been a victim of a data breach event and/or reporting a data breach event, using a user device 30 and/or means such as one or more of in-person contact, telephone, facsimile, short message service (SMS), multimedia messaging service (MMS), written (mailed) correspondence, etc. In one example, one or more of the services provided by reporting server 40 and/or the resource server 50 could be integrated with the consumer's BC risk profiles and/or the BC server 12, via an API, etc., such that the consumer can receive notifications via the BC server 12 and/or the BC system 100 and/or access information from the reporting server 40 and/or resource server 50 via the BC server 12 and/or the BC system 100, including notifications of breach activity including breach events 70, advisements to activate mitigation actions 116, changes to exposure ratings 132 due to observed activities including for example, fraudulent transactions, unauthorized distribution of the consumer's breached information, etc. For example, reporting of an occurrence of a particular type of harm on a consumer-specific account by a reporting provider to the BC system 100, such as a fraudulent transaction on the consumer's account, for example, via integration of the reporting server 40 with the BC server 12, could trigger a revision by the BC server 12 of the exposure rating 132 for that consumer's BC risk profile. The BC server 12, using the revised exposure rating 132, can apply algorithms 10 to update the consumer's mitigation actions 116 and/or rankings of these mitigation actions 116, and can output notifications to the consumer and/or to a resource server 50 or resource provider associated with and/or potentially affected by the reported occurrence. For example, the occurrence of a fraudulent in-store payment card transaction, using breached codes stored on the magnetic stripe of a consumer's payment card, and reported via a reporting server 40 to the BC server 12 can initiate a revision by the BC server 12 of the consumer's exposure rating 132 and/or mitigation actions 116, including outputting a notification to a resource server 50 of a resource provider such as the payment card issuer, to modify fraud alerts and/or authorization requirements for in-store transactions where the consumer's payment card is presented for use. In another example, the BC system 100 can output a mitigation action 116 and/or provide a notification or alert to a consumer-victim of a breach event 70 that includes their phone number and/or email address as breached information elements 68, to advise the consumer-victim that they are at increased risk of receiving phone calls or emails from identity criminals.

Figure 2:
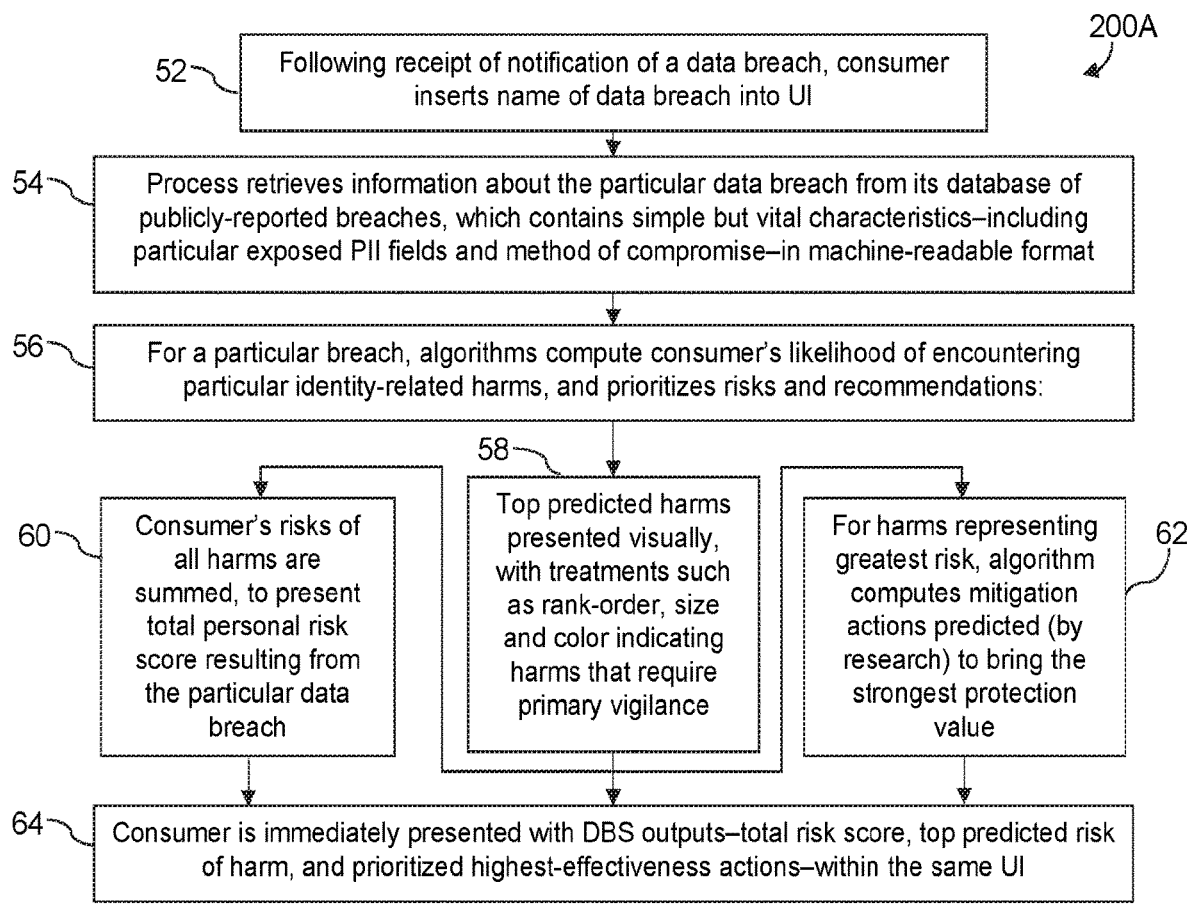
FIG. 2 is a schematic illustration of a flowchart of an exemplary process for generating the risk-related outputs related to a breach event.

Referring to FIGS. 1 and 2, FIG. 2 is a flowchart 200A illustrating a high-level overview of the Breach Clarity™ process, including both the consumer's input and output as bookends, with an abbreviated overview of the BC algorithm 10 in the middle. The Breach Clarity™ process includes a method 200 described herein, which by way of non-limiting example comprises flowcharts 200A, 200B and 200C. As shown in FIG. 2, at step 52, a consumer-victim, also referred to herein as a consumer, inputs the name of the breach event 70 into a user interface, for example, into one of the user interfaces 90C, 90D in communication with the BC server 54. At step 54 the BC server 12 retrieves breach event information about the particular breach event 70 from the BC data structure 22, in machine readable format. In one example, the breach event information can be organized and stored in the data structure 22 of the BC server 12, using a data table such as the data table 22A shown in FIG. 3, which, in one example, can be output for viewing on the user device 30 as a user interface 90A. The data table 22A shows a set of information elements 68 which can be subject to breach, and a listing of breach events 70. In an illustrative example, the information elements 68 can include one or more of personally identifiable information (PII), protected health information (PHI), payment card industry (PCI) data, and other such information which can, if breached, expose the breached victim to risk and/or harm. At step 56, for the particular breach 70 selected by the consumer, the BC server 12 executes one or more algorithms 10 to compute the consumer's likelihood of encountering particular identity-related harms, and prioritizes risks and recommendations. The algorithm 10, in one example, utilizes the data table 22B shown in FIG. 4 and described in additional detail herein, to determine an element risk score 74 assigned to each data-pair in the table, where a data-pair consist of an information element 68 and a potential harm 72. For example, referring to FIG. 4, the algorithm 10 has assigned an element risk score 74 of "10" to the data-pair consisting of the harm 72B "New Account Creation" and the information element 68A "Social Security Number." The element risk score 74 for each data pair consisting of a harm 72 associated with a breached information element 62 can be derived based on one or more of industry reported information, and/or qualitative and quantitative research, and stored in the BC data structure 22, for example, in data table 22B.

Figure 8:
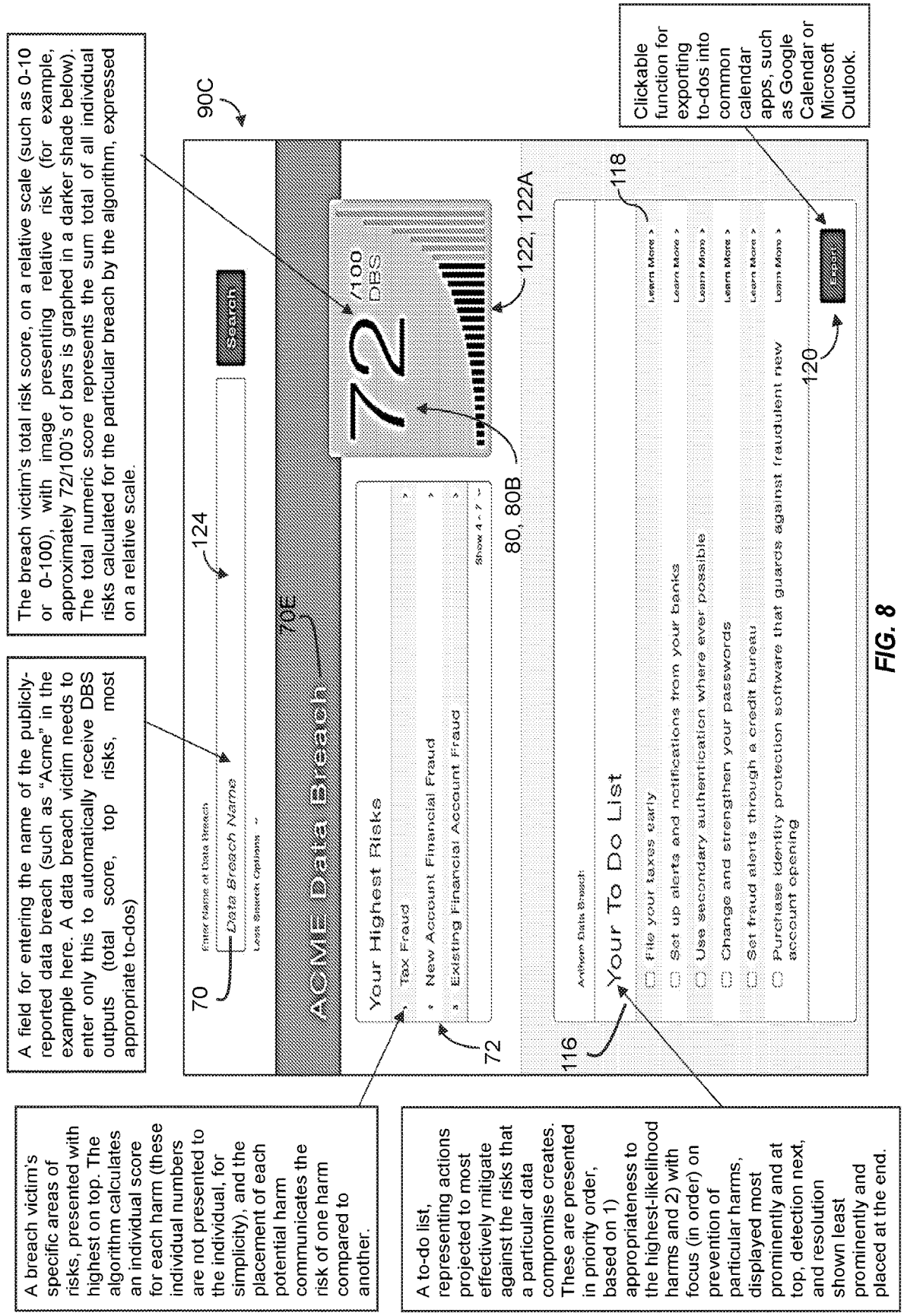
FIG. 8 is a schematic illustration of an exemplary user interface for displaying the outputs from the method of FIG. 7.

At step 58, an algorithm 10 is applied to rank order and/or identify the top predicted harms 72. The BC server 12 can output these for visual presentation, and displayed for viewing by the consumer as a user interface 90. The top predicted harms 72, including treatments such as the element risk score 74, rank-order, size and color indicating the harms 72 that require primary vigilance, can be displayed shown in a first non-limiting example in the data table 22C, and/or in other non-limiting examples as shown in the user interface 90C illustrated in FIG. 8 and the user interfaces 90J, 90K, 90L, 90M, 90N, 90P, 90Q, 90R, 90S illustrated in FIGS. 15-23. The displayed list of particular harms 72 (such as tax refund fraud or existing credit card fraud) are prioritized and/or ranked based on those harms 72 that are predicted by the algorithm 10 to be most likely based on the unique characteristics of any particular breach event 70. At step 60, and as shown in FIG. 6, the method 200 sums, for each harm 72, the element risk score 74 for all information elements 68 determined by the algorithm 10 to be susceptible to that harm 72, to generate a harm risk score 76. In the example shown, the algorithm 10 totals the harm risk scores 76 to generate a data breach score 80, which in the example shown in FIG. 6 is an absolute data breach score 80A having a value, in the example, of 83. In one example, the algorithm 10 can include applying a modifier to the sum total of the harm risk scores 76 to generate the data breach score 80, where the modifier can, for example, be based on the number and/or types of information elements 68 exposed by the breach event 70, the number and/or types of harms 72 associated by the algorithm 10 with the breached information elements 68, an exposure rating 132 applied to the breach event 70, etc., such that the example of a totaling or summing algorithm 10 is illustrative and non-limiting. The data breach score 80, which in the illustrative example is referred to as a Breach Clarity™ score or a BC score 80, is the breach victim's overall risk score for the particular breach event 70. At step 60, the algorithm 10 can generate a relative BC score 80B, as shown in FIG. 8, where the relative BC score 80B is expressed as a numeric value relative to a fixed scale between 0 and an upper limit (such as 10, 50, 100 or other scale limit). The algorithm 10 can apply a modifier and/or scaling factor to the absolute value of the BC score 80 to derive a scaled BC score for the breach event 70. In one example, the modifier is a division factor which can be applied to convert the absolute value to a scaled BC score 80, where the division factor is derived from, for example, breach industry data, qualitative research, and/or quantitative research, and/or derived from one or more of all, a portion of, or a sampling of the breach data stored in the data structure 22. In one example, the modifier can include based on an exposure rating 132 identified for that breach event 70, and/or on the number and or severity of the harms 72 and/or breached information elements 68 associated in the data structure 22 with that breach event 70. In an illustrative example shown in FIG. 8, the value of the relative BC score 80B is 72/100, where 100 is the upper limit of the BC scale, and is displayed in the user interface 90C both as a numerical value "72" and graphically on a BC scale 122, such as the graphical exponential scale indicated at 122A, which may be color coded, for example, Red-Yellow-Green, based on the magnitude of and/or risk associated with the BC score 80B being displayed. In an illustrative example shown in FIGS. 15-23, the value of the relative BC score 80C uses a scale having an upper limit of ten (10), and is displayed in the user interface 90 on a graphical BC scale 122B, as a circular icon positioned relative to a slide bar (graphical BC scale 122B), and as a numerical value displayed within the circular icon. The slide bar, e.g., the BC scale 122B, may be color coded, for example, Red-Yellow-Green, based on the magnitude of and/or risk associated with the BC score 80C being displayed. For example, referring to FIG. 15, a BC score 80C of "10" for a breach event 70 described as "OPM #2" (Office of Personnel Management #2) is displayed within a red circular icon 80C positioned on the far right (as shown on the page) "red" end of the yellow-to-orange-to-red shaded BC scale 122B, where the BC scale 122B has an upper limit of ten (10), indicating the breach event 70 described as "OPM #2" has a BC score 80C of "10" relative to other breach events 70 in the BC system 100. In a related example, referring to FIG. 16, a BC score 80C of "4.9" for a breach event 70 described as "Citibank, NA" is displayed within a yellow circular icon 80C located in an intermediate position (as shown on the page) in the orange portion between the ends of the yellow-to-orange-to-red shaded BC scale 122B, where the BC scale 122B has an upper limit of ten (10), indicating the breach event 70 described as "Citibank, NA" has a BC score 80C of "4.9" relative to other breach events 70 in the BC system 100, e.g., presents relatively less risk to the consumer than the "OPM #2" breach event 70 shown in FIG. 15.

At step 62, the process continues with a prioritized list of particular consumer fraud-mitigation actions 116, which can include, for example, actions such as obtaining a credit freeze, setting a fraud alert, or credit monitoring, being generated by the BC system 100 using the data structure 22. The particular mitigation actions 116 identified for the particular breach event 70 are ranked to generate an action set of mitigation actions 116 (see FIG. 8) which represents the relatively strongest protection against the particular risks and harms 72 identified by the BC system 100 for the particular breach event 70. In one example, the algorithm 10 utilizes a data table 22D as shown in FIG. 11, which can be included in the data structure 22, to determine an action prioritization factor 136 for each data-pair in the table 22D, where a data-pair consists of mitigation action 116 and a potential harm 72. For example, referring to FIG. 11, the algorithm 10 has assigned an action prioritization factor 136 of "10" to the data-pair consisting of the harm 72B "New Account Creation" and the mitigation action 116A "Set fraud alerts." The action prioritization factor 136 for each data pair consisting of a harm 72 associated with a mitigation action 116 can be derived based on one or more of industry reported information, and/or qualitative and quantitative research, and stored in the BC data structure 22, for example, in data table 22D. In one example, the algorithm 10 uses the prioritization factors 136 assigned to each harm-mitigation data pair associated with a breach event 70 in determining the rank order, e.g., the prioritization, of the mitigation actions 116 generated as a risk output by the BC server 10 for that breach event 70. The example is non-limiting, and the algorithm 10 can use other inputs, such as the exposure rating 132 of the breach event 10, in determining the rank order of the recommended mitigation actions 116.

At step 64 the BC outputs, including the BC score 80, the most likely, e.g., top predicted harms 72, the prioritized mitigation actions 116, and the exposure rating 132 (see the examples shown in FIGS. 19-23), are presented to the consumer-victim via a user interface 90, and advantageously, in a presentation format designed for consumer use. The user interface 90 examples provided herein are advantaged by organizing the BC outputs an easily understood and graphically summarized format, in contrast with ad-hoc, segmented, and/or otherwise generalized consumer data breach advice and/or information which a consumer may otherwise be presented with from multiple sources. Further, the exemplary user interfaces 90 which can be generated by the BC server 12, as shown in FIGS. 12-23, include one or more graphical user interfaces (GUIs) including links to reporting and resource servers 40, 50, etc., for the convenience of the consumer in accessing reporting and resource information, for example, from account providers, setting alerts, and/or initiating other mitigation actions 116 as may be identified as BC outputs for the consumer by the BC system 100. Referring to FIG. 1 and the non-limiting examples of data structure elements 22A, 22B, 22C and 22D shown in FIGS. 3, 4, 6 and 11, the BC data structure 22 includes data and information compiled from a comprehensive listing of breach events 70 and is augmented with additional breach information as breach events 70 are reported, such that the BC data structure 22 can be continually updated to includes breach information from substantially all current data breach events 70. The breach information stored in the BC data structure 22 is uniquely parsed to identify information element fields that correspond to the breached information elements 68 which are publicly reported in data breach notification letters distributed to consumer-victims. The publicly reported breach notifications are generated, in an illustrative example, by a reporting entity using breach information which may be stored in a reporting database 36. As described previously, this breach information can be obtained by the BC server 12 from the reporting database 36, for example, via the network 130 or by other data transfer means, and stored by the BC server 12 in the BC data structure 22. The BC data structure 22, compared with existing publicly reported data breach lists, is substantially advantaged by being substantially expanded in content and extensively modified to include quantitative research including research quantitatively relating a breached information element 68 with one or more potential harms 72. Information reported for each breach event 70, for example, by a reporting entity and/or from a reporting database 36 about the breach event 70 is parsed into as many as 40 or more record fields in the BC data structure 22, appended with additional information on each breach event 70 that could have a material outcome on victimization, and tabulated into a machine-readable formats, such as the non-limiting examples shown in FIGS. 3, 4 and 6 designed specifically for use with BC algorithms 10. Currently, the contents of all publicly-available data breach notices, such as those reported by individual reporting entities, are not available in a single database, and may not be available in machine-readable format to allow algorithms (such as those described in this document) to compute predictions or recommendations. Further, data breach information which is available from a database, such as a reporting database 36, can vary in format and structure presenting a substantial challenge to consolidating the breach information for analysis and quantification of risk. The BC data structure 22 which maps data received from a plurality of differently configured reporting databases 36 into a standardized data structure 22, and the BC method for generating risk outputs, provides a standardized and current database 22 of breach information and an efficient and standardized approach to quantifying the risks and harms 72 to a consumer-victim associated with a data breach event 70, for that particular breach event 70 and relative to other breach events 70. In one example, the BC server 12 can be integrated with one or more of the reporting servers 40 and resource servers 40, via APIs or otherwise, to automatically receive current information, updates, etc. from these servers 40, 50, such that the breach information stored in the BC data structure 22 is updated in real time or in near real time with updates made to the data in the servers 40, 50. As such, the BC system 100 is advantaged by near real time reporting of breach events 70, to minimize the time between the occurrence of a breach event 70 and the time when the BC system 100 has completed assessment of that breach event 70 including generating breach outputs such as a BC score 80, listing of breached information elements 68, ranking of potential harms 72, exposure rating 132, and prioritized mitigation actions 116.

Referring to FIG. 3, in the example shown, a consumer initiates the Data Breach Score system 100 by providing the name of a particular data breach (such as "Azure Jewelers", breach event 70F in the hypothetical example shown in FIG. 3), for example, via a user interface 90, where the "Azure Jewelers" input is associated via the BC data structure 22 with the information elements 68A and 68I which have been reported as breached in the Azure Jewelers breach event 70F, and a program-ready form of information that can be thought of as "a Social Security number (SSN) (element 68A) and email address (element 68I)" is generated. The particular data breach 70F (in the current example) can be stored in the data structure 22, as associated with particular compromised information element fields 68A, 68I. The BC server 12 applies algorithms 10 to the breached element fields 68A, 68I and to other characteristics unique to the particular data breach 70F (in the current example) to compute the BC outputs including potential harms 72 most strongly enable by SSN and email address exposure, element risk scores 74 for each harm-information element combination, harm risk scores 76 for each harm considering all information elements 68 breached in the particular breach event 70F, an exposure rating 132, action prioritization factors 136, and/or a total BC score 80 for the Azure Jewelers breach event 70F, as illustrated in the example shown in FIG. 6.

Note that for purposes of brevity, only a subset of the many publicly-reported breachable information elements 68A, 68B, . . . 68n are listed in the information element fields of the data table 22A shown in FIG. 3. The scope of information elements 68 which are breachable is not intended to be limited to the specific examples provided herein, and it would be understood that all types and/or categories of breachable information elements 68 including personally identifiable information (PII), protected health information (PHI), payment card industry (PCI), and other forms of breachable information, such a consumer's biometric information, social identity information, on line images, etc., that could be used to cause a harm 72 to the consumer if breached, is included within the scope of information elements 68 that can be collected, stored and analyzed by the BC system 100 and method 200. By way of illustrative example, information elements 68 which can be stored in the BC data structure 22 and used in the analysis of breach information and generation of risk outputs by the BC algorithms 10 and applications 20 include, but are not limited to a consumer's Social Security number (SSN or the non-U.S. government equivalent thereof); date of birth (DOB); birthplace, birth certificate number, passport number; credit report; driver's license number; state ID information; citizenship documents or related data; voter registration or affiliation; government security clearance or related status; taxpayer ID; employer; employee number; work address and phone number; income (including 1099 and W-2 and other wage information or the non-U.S. government equivalent thereof); work address; email address; email password; student ID; other non-financial account number; credit, debit or prepaid account number; cardholder or other financial accountholder name; card expiration date; card secret code; card PIN; financial account bank routing number; loan or mortgage account information such as balances and payment history; financial aid information; medical provider or insurer account number, password, medical history, medical procedures, diagnosis, prescriptions; other medical provider (such as Medicare); home address (current or prior); phone numbers for home, work or mobile; 401k and other investment account data; name in conjunction with other PII data; account numbers, user names, passwords and activity for accounts other than financial, payment card, medical and email accounts (for example, social media, internet access, utilities or online shopping); professional license number, credentials and certifications and similarly related information; biometric identifiers; and so on. In the non-limiting example shown in FIG. 3, the data table 22A uses an indicator 66, illustrated in FIG. 3 by an exemplary "X" to indicate the particular information elements 68 which have been breached in a particular breach event 70. In an illustrative example, breach event 70E identifies the breached entity as "ACME Health" and the information elements 68 which were breached in the breach event 70E as the consumer's birthplace, medical account number, and name.

Figure 4:
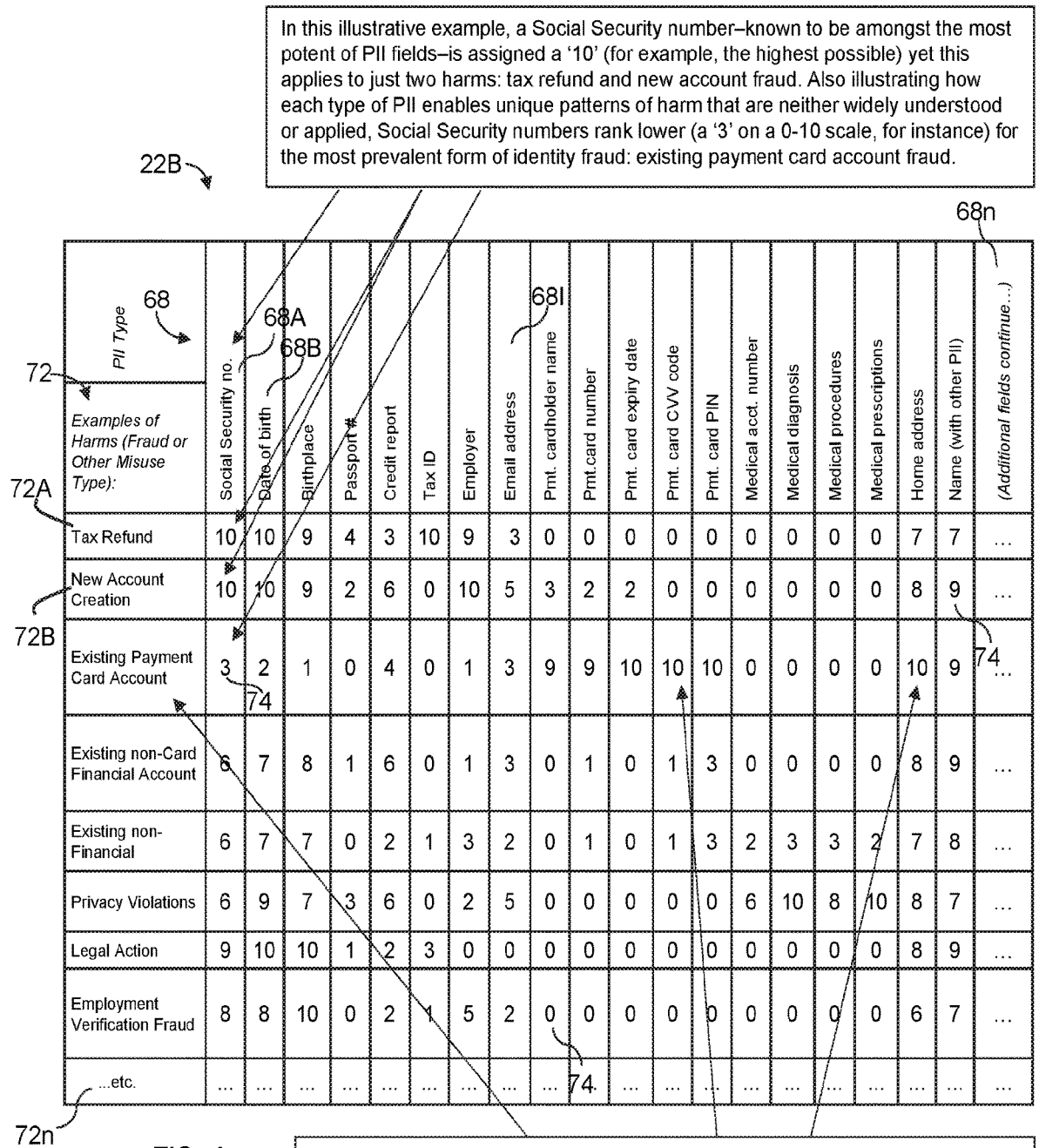
FIG. 4 is a schematic illustration of an exemplary data table showing a listing of harms, a listing of breachable information elements, and an exemplary element risk score generated by an algorithm of the system of FIG. 1 for each harm-information element combination.

Referring to FIG. 4, it should be noted that for purposes of brevity, only a subset of the many potential risks and harms 72A . . . 72n are listed in the harms fields of the data table 22B shown in FIG. 4. By way of illustrative example, possible harms 72 which can be stored in the BC data structure 22 and used in the analysis of breach information and generation of risk outputs by the BC algorithms 10 and applications 20 include, but are not limited to, tax fraud (including federal, state, county and city); new account financial fraud; new account fraud for non-financial accounts (such as utilities or cable); existing account fraud including payment cards, depository accounts, investment accounts, loan and mortgage accounts, insurance accounts; other account fraud including internet, merchant, online shopping (such as Amazon); social media, utility; government benefits fraud such as Social Security, welfare, or Medicare; fraudulent identity credential issuance or misuse (such as passport or driver's license); property rental fraud, and so on. As illustrated in FIG. 4, the BC system 100 includes algorithms 10 and/or applications 20 for creating a data structure 22, shown in a non-limiting example as a data table 22B in FIG. 4, which includes an element risk score 74 determined by the BC algorithms 10 and/or quantitative research, where the element risk score 74 is derived from and represents a risk-value of the relationship between a particular breached information element 68 and a particular harm 72. Examples of harms 72 are shown in FIG. 4 including tax refund fraud identified as harm 72A, new account fraud identified as harm 72B, health privacy violations, legal action fraud, and so on as shown for the listing of potential harms 72A . . . 72n. By way of illustration, and referring to FIG. 4, a breach of a Social Security number (identified as information element 68A in the figure) as generating a potential risk of tax refund fraud (identified as harm 72A in the figure) is assigned a value of "10" for its element risk score 74, where the element risk score 74 may have a value within a predetermined scale, for example, of 0-10, with an assigned value of "10 representing the highest potential risk of the harm occurring. In another example, and referring to FIG. 4, a breach of an email address (identified as information element 68I in the figure) as generating a potential harm of fraud on an existing payment card account is assigned a value of "3" thus presenting a relatively lower risk of harm on the risk-rating scale of 0-10. It should be noted that the value assigned to each element risk score 74 for each particular information element-harm pair is derived from aggregated research including quantitative research surveys specifically designed for development of the BC process, which are conducted with industry professionals experienced in preventing or detecting misuse of particular information elements 68 (including PII, PHI or PCI fields), for particular harms 72, including those listed information elements 68 and harms 72 described herein, such that it would be appreciated that the development of the element risk score 74 for a particular information element-harm pair is not a simple mathematical calculation nor based on publicly available information, but rather, the result of extensive quantitative research consolidating and analyzing input collected from a variety of data breach experts, diverse sources and structures of data breach information, and additional secondary research as further described herein, including for example, research related to the breaching party, the time relationship between a breach event and the risk of occurrence of a particular harm, etc.

Figure 10:
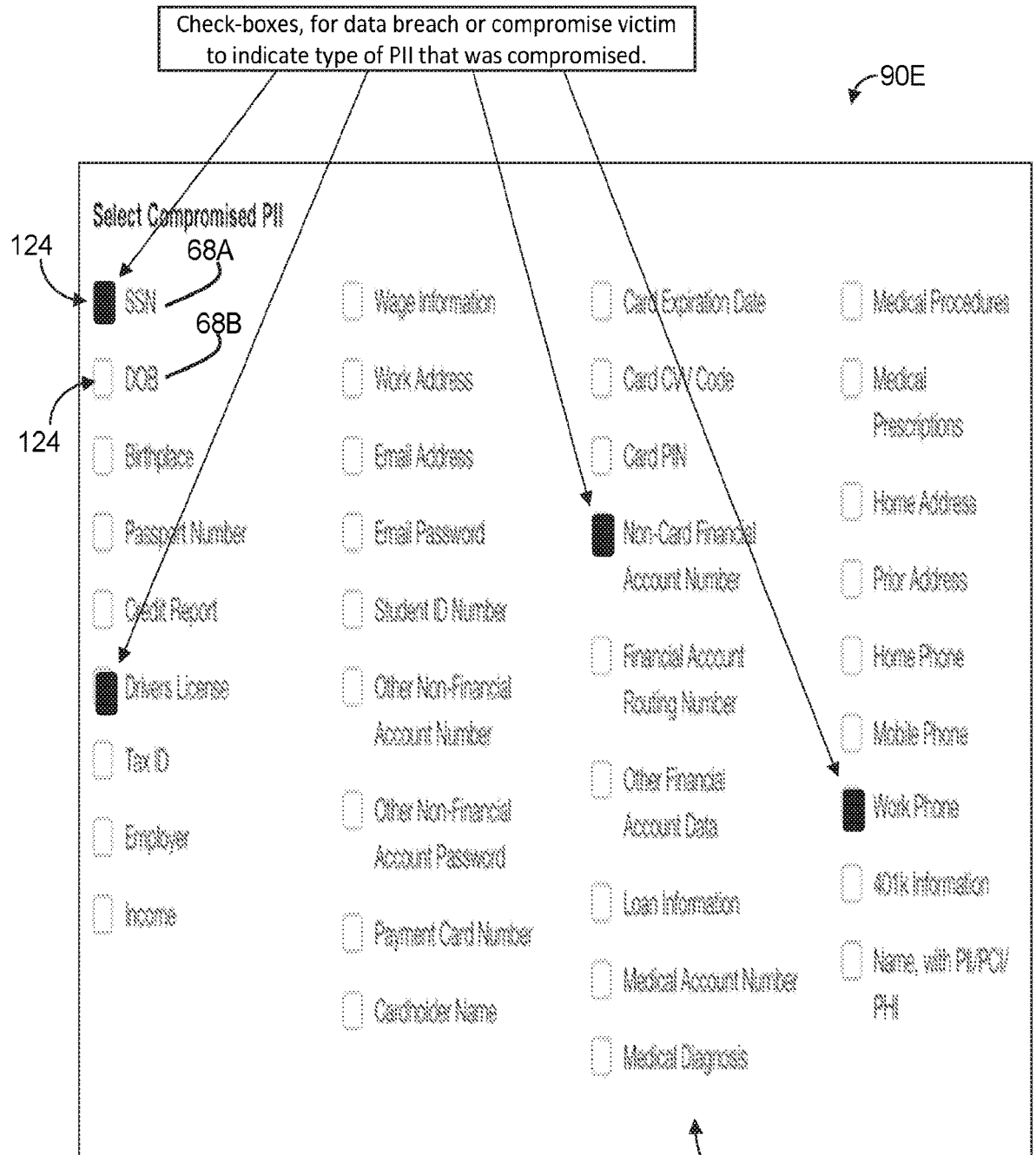
FIG. 10 is a schematic illustration of another exemplary user interface for accessing risk outputs for one or more breached information elements, using the BC system.

The data structure 22B represented by the table shown in FIG. 4 is populated with the element risk score 74 determined for each particular pairing of an information element 68 and a harm 72, using quantitative research and secondary research, and is used by algorithms 10 to compute BC risk-outputs for each breach event 70 entered into the BC system 100 and data structure 22, including publicly-reported data breach events such as, for example, breach events 70A, 70B, 70E, 70F, . . . 70n shown in FIG. 3, and to compute BC risk-outputs for an individual consumer breach event 70, for example, theft of a consumer's wallet including information elements such a SSN, driver license numbers, account numbers, etc., which may be entered into the BC system 100 by a consumer-victim via a user interface 90E as shown in FIG. 10. For each information element 68, the table shown in FIG. 4 illustrates which particular harms 72 are most strongly (or weakly) enabled by criminal possession of the breached information element 68 (with examples showing an upper limit such as '10' representing the highest risk and '0' representing negligible or no risk). Reading table 22B to the right for any particular type of harm 72, the element risk values 74 entered for each information element 68 shows which of the information elements 68, when breached, create the greatest risk of that harm 72 being realized by a data breach victim. The example shown in FIG. 4 is for illustrative purposes only, such that the particular values entered for each element risk score 74 in data table 22B are illustrative and non-limiting. It should be appreciated that the quantitative research from which the value of each element risk score 74 is derived is conducted periodically such that the element risk score 74 can be updated as newly collected research results are incorporated into the BC data structure 22 and/or BC algorithms 10. Further, the algorithms 10 used to determine the BC risk outputs can be updated and revised based on the inputs and results of ongoing and periodically conducted quantitative research, current and newly acquired breach information, and current and newly acquired secondary research including research related to breaching entities (hackers, criminal organizations, etc.) and to risks and potential harms 72, including, for example, research and information related to the selling and use of breached information elements 68, such that the algorithms 10 and/or the values of element risk scores 74 for the information element-harm pairs can be dynamically updates as new research and data breach information is introduced.

Referring now to FIGS. 5 and 6, an illustrative example using the fictitious breach event 70 referred to in the figures as the "Azure Jewelers Breach" event 70F is shown. The method 200 including flowchart 200B shown in FIG. 5 and including steps 82, 84, 86 and 88 illustrates the application of the BC system 100 to the Azure Jewelers Breach event 70F to generate the risk-outputs shown in the data table 22C of FIG. 6, including a listing of harms 72 associated with each of the breached information elements 68A, 68I, and the element risk score for each harm-information element pair obtained from the data table 22B shown in FIG. 4. The data table 22 also shows a harm risk score 76 for each harm 72, which indicates the risk of that particular harm 72 based on the combination of information elements 68 which were breached during the breach event 72. In the illustrative example, the harm risk score 76A for fraud on a tax refund (harm 72A in the figure) is the sum of the element risk score 74A for risk of harm 72A from the breach of a SSN number having a value of "10" in the example, and the element risk score 74I for risk of harm 72A from the breach of an email address having a value of "6" in the example, generating a harm risk score 76A having a value of "16" related to harm 72A of tax refund fraud. In the example shown, the harm risk scores 76 are summed to generate an overall BC score 80, which in the illustrative example is an absolute BC score 80A. In the example shown, the data table 22C can include a comment field 78 for recording and/or associating comments, observations etc. with the particular harm 72.

As previously described herein, the BC algorithm 10 can be configured to generate a relative BC score 80B, where the relative BC score 80B can be derived from the absolute BC score 80A and expressed as a value on a fixed scale such as a scale of 0 to 50, a scale of 0 to 10, a scale of 0 to 100, etc. as shown in the examples of FIG. 8 and FIGS. 15-23, such that the BC score 80B of a particular breach event 70 can be compared with BC scores 80B generated for other breach events 70, for understanding the relative risk of one breach event 70 as compared to another breach event 70. In one example, the data table 22C can be displayed to the consumer-victim as a user interface 90B, for example, via the input/output interface 128 of a user device 30 accessing the BC system 100. The use of a simple summing algorithm for determining a harm risk score 76, and for determining an overall absolute BC score 80A is illustrative and non-limiting. For example, the harm risk score 76 and/or the BC score 80A can be generated using an algorithm 10 which includes other operators, modifiers, and/or operands in addition and/or applied in conjunction with summing functions, where the operators, modifiers, and/or operands can be derived from breach information related to the particular breach event 70 for which the harm risk score 76 and BC score 80 is being calculated, such as information related to the breaching organization or post-breach containment actions taken by the breached entity 70, and/or other breach related information, such as research, current market conditions and/or industry intelligence related to the availability and exposure of the breached information, for example, for sale on the dark web, of the breached information elements 68. As such, several additional factors can be applied by the BC algorithms 10 and/or incorporated into the data structure 22C in order to generate risk-outputs and BC results as shown in FIG. 6 which are timely, relevant, accurate and easily understood by the consumer-victim. In the example data table 22C, additional algorithms 10 and/or proprietary research can be used identify and/or prescribe consumer mitigation actions 116 that best address the highest-scoring areas of risk to the consumer-victim.

Figure 7:
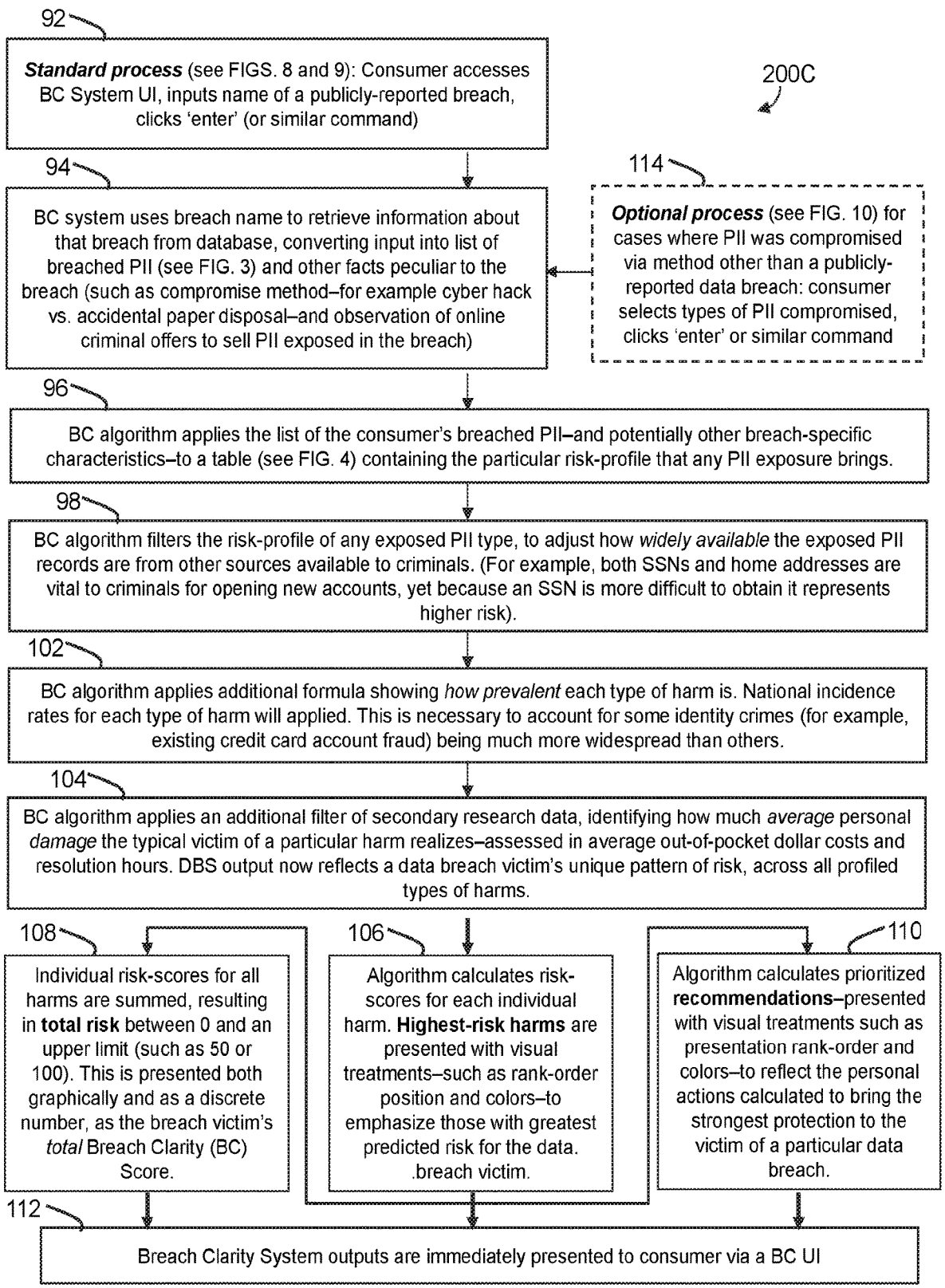
FIG. 7 is a schematic illustration of a flowchart of an exemplary method for computing a Breach Clarity™ (BC) score for a particular breach event.

Referring now to FIG. 7, a flowchart 200C, which is included in the BC method 200, is provided which includes steps 92 through 114 as described in FIG. 7, illustrating aspects and/or features of the BC algorithm 10 which can be utilized with and/or incorporated into the basic methodology illustrated by flowchart 200A of FIG. 2, where flowchart 200A is included in the BC method 200 described herein. In one example, the BC algorithm 10 illustrated by flowchart 200C generates the BC score 80 as a relative BC score 80B, as a numerical score from 0 to an upper limit (such as 50 or 100), factoring in those harms 72 most commonly encountered by data breach victims, specific harms 72 that are most strongly predicted as determined by the BC methods described herein, and highest-payoff mitigation actions 116. The flowchart 200C illustrates use of the BC algorithms 10 to generate risk-outputs for a known, e.g., public and/or reported data breach event 70, using steps 92 through 112 shown in FIG. 7, and further provides for use of the BC algorithms 10 to generate risk-outputs for an individual consumer breach event 70, using step 114 where a consumer-victim enters the breached information elements 68 via an example user interface 90E shown in FIG. 10, and the BC algorithm is applied as described in steps 94 through 112 shown in FIG. 7, to generate the risk-outputs for the individual data breach event 70.

Figure 9:
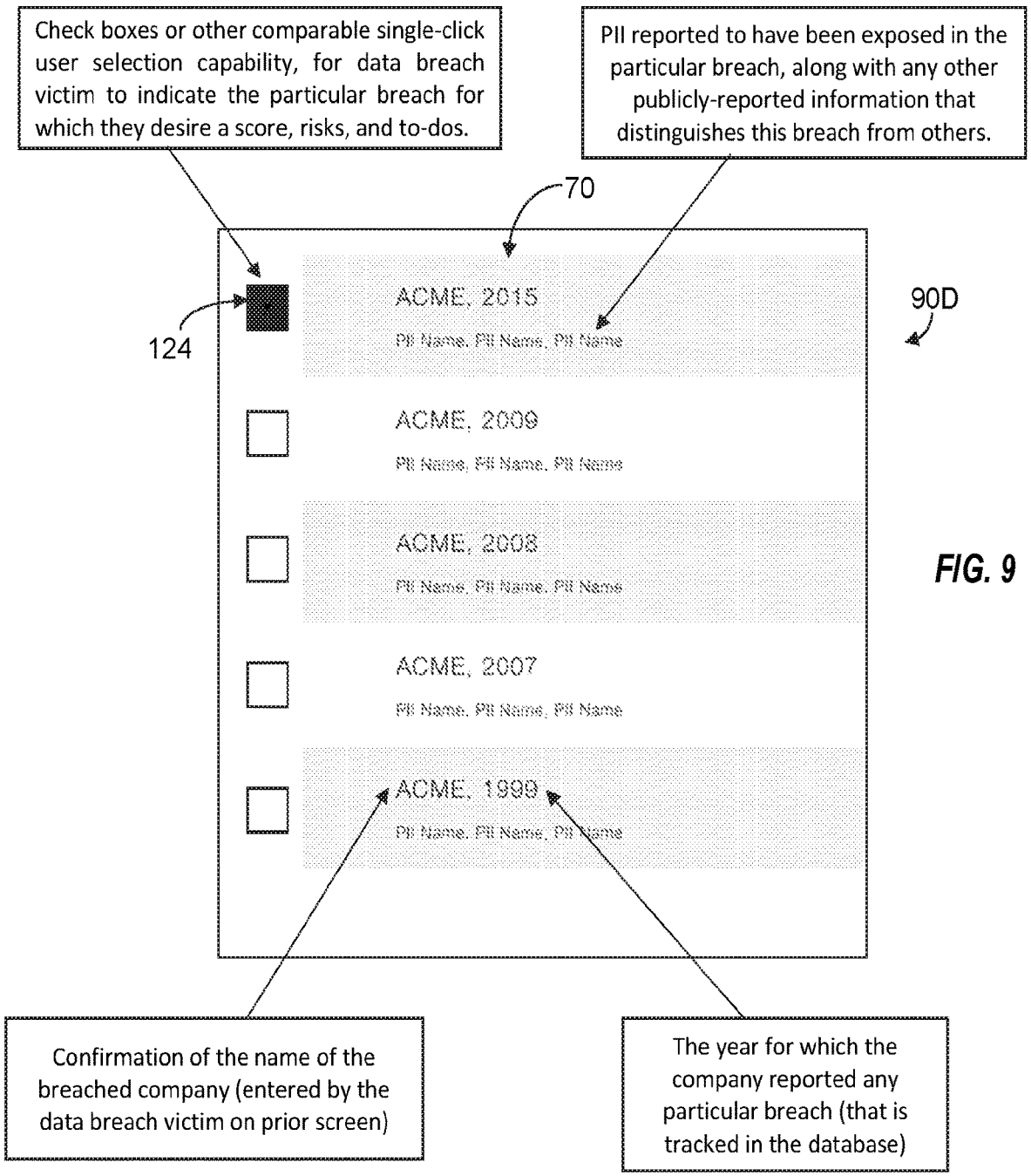
FIG. 9 is a schematic illustration of an exemplary user interface for accessing risk outputs for a particular breach event using the BC system.

As shown in FIG. 7, at step 92 the breach event 70 is inputted to the BC system 100 by the consumer-victim, via a user interface 90, which may be, for example, the user interface 90C shown in FIG. 8 where the consumer inputs the name of the breach event 70 into a breach input field 124, or the user interface 90D shown in FIG. 9 where the consumer selects a breach input field 124 associated with the consumer's breach event 70 from a menu of breach events which can include additional descriptive breach information such as the date of the breach event 70 and/or the information elements 68 breached during the breach event 70. In other examples shown in FIGS. 12-23, the user interface 90 can include a breach input field 124 configured as a test box, a search field, and/or a drop-down menu listing known breach events 70 included in the BC system 100. The consumer-victim can, for example, obtain the breach information from a notification of the breach event 70 provided by a reporting entity. Optionally, the consumer can enter, at step 114, the compromised (breached) information elements 68 via a user interface 90 such as the user interface 90E shown in FIG. 10. The consumer-victim can be requested to enter other essential information, such as a category of compromise, method of breach, time the compromise of the information elements 68 occurred and/or was detected, which can be stored in the data structure 22 associated with the consumer-victim, and used by the BC algorithms 10 in generating the risk-outputs. This provides an option to the consumer-victim to receive an assessment of harms 72 and mitigation actions 116 which can be initiated by the consumer, in a circumstance where the breach event 70 is an individual breach, for example, the theft of an individual wallet, and/or when the name of the breach event 70 is not available or unknown. The option illustrated at step 114 can be useful for individuals who might have self-compromised their own information elements 68, for example, by disclosure via social media, in an unsafe disposal of a personal computing device, via a loss of a payment card or other personal information such as medical records. Note that the example user interface 90D in FIG. 10 shows only a partial list of all commonly-reported exposed information elements 68, for brevity of illustration. Use of the optional consumer input method shown in step 114 will produce results, e.g., risk-outputs, that are substantially similar to those generated by the BC system 100 for a particular breach event 70 having the same characteristics and/or combination of breached information elements 68 as inputted via step 114.

After receiving consumer input via either of steps 92 and 114, the method continues at step 94, where, using the information identifying the breach event 70, the BC server 12, for example, via a BC application 20, accesses the BC data structure 22 to retrieve information associated with the breach event 70, including the specific information elements 68 exposed in breach event 70, if not already received from the consumer via the user interface 90D. In one example, the server 12 retrieves other characteristics unique to the breach event 70 for use by the algorithms 10 in generating the risk-outputs. For example, the method of data exposure, and/or the availability of breached data in so-called "Dark Web" marketplaces where criminals sell breached information elements 68, etc., can be retrieved from the data structure 22 for use by the algorithms 10, which can include an algorithm 10 for generating an exposure rating 132.

At step 96, the BC application 20, for each of the information elements 68 which have been compromised by the breach event 70, retrieves an element risk score 74 for each potential harm associated in the data structure 22 with the breached information element 68, as described for FIG. 4, where an element risk score 74 is generated for each information element-harm pair. The element risk score 74 is generated by the BC algorithm 10.

At each of steps 98, 102 and 104, the BC algorithm 10 can use data breach information retrieved from the BC data structure 22 to modify, weight, and/or filter the element risk scores 74 generated in step 96, prior to generating a harm risk score 76 for each identified potential harm 72.

For example, at step 98 the BC algorithm 10 can apply a weighted percentage to factor for the general availability of the exposed information element 68, where the general availability is determined from quantitative research and can reflect the general availability of the exposed information element 68 from non-breach sources. For example, for an exposed information element 68 of a home address, the applied factor can reflect the general availability of the consumer's home address from public available records and/or other publicly available information resources such as online directories.

For example, at step 102, the BC algorithm 10 can apply a weighted percentage to factor for the general prevalence of each potential harm 72 associated in the data structure 22 with the breached information element 68.

For example, at step 104, the BC algorithm 10 can apply a weighted percentage to factor for the expected personal damage of each potential harm 72 to the individual consumer. The expected personal damage may be quantified in the data structure 22, for example, in potential financial loss in dollars due to fraud, etc., or as expense incurred in implementing mitigation actions 116, and/or time in hours lost to containing, preventing, and/or rectifying the damage from the harm 72 or executing mitigation actions 116. The expected personal damage may be quantified, for example, as the result of quantitative research collected from multiple resources and/or reporting entities, and/or supplemented from publicly available information and/or information collected by the BC system 100 from consumer-victims via the user interface 90, or modified using an exposure rating 132 determined for the particular breach 70. In one example, demographic and/or behavioral information collected from and/or about the individual consumer-victim, as described previously herein, and/or other information in the consumer-victim's risk profile stored in the BC server 12 including for example, other breach events 70 by which the consumer-victim has been victimized, can be factored into an algorithm 10 in estimating and/or determining the expected personal damage of each potential harm 72 to the individual consumer-victim.

At step 106, the algorithm 10 calculates a harm risk score 76 for each potential harm 72 identified for the breached information elements 68, where the numeric value of the harm risk score 76 represents the predicted likelihood that the breach victim will experience the particular harm 72 for which the harm risk score 76 is provided. In a modification of the method described for the generation of the harm risk score 76 in FIG. 6, the algorithm 10, at step 106, generates a harm risk score 76 for each particular harm 72 applying the factors described for steps 98, 102 and 104, to determine a finalized risk score 76 for each potential harm 72. The top harms 72, e.g., the harms 72 generating the relatively higher harm risk scores 76, are presented in visual representation to the consumer. In one example, the top harms 72 can be presented as the consumer's highest risks as illustrated by the user interface 90C shown in FIG. 8.

At step 108, a total BC score 80 is generated, representing the risk associated with all of the particular potential harms 72 associated by the BC algorithms 10 with all of the particular information elements 68 which have been compromised by the breach event 70. In the example user interface 90C shown in FIG. 8, the BC score 80 can be presented as a numerical value, and in a graphic representation 122. The numerical value of the BC score can be a relative BC score 80B, e.g., expressed relative to a fixed BC scale. Referring to the example shown in FIG. 8, the value of the relative BC score 80B is 72/100, where 100 is the upper limit of the BC scale 122A, and is displayed in the user interface 90C both as a numerical value "72" and graphically on a BC scale 122A, which may be color coded, for example, Red-Yellow-Green, based on the magnitude of and/or risk associated with the BC score 80B being displayed. Referring to the examples shown in FIGS. 15-23, the value of the relative BC score 80C is expressed on a scale including an upper limit of "10", and is displayed in the user interface 90 both as a numerical value shown in a circular icon and graphically on a color-coded BC scale 122B, which may be color coded, for example, Yellow-Orange-Red, based on the magnitude of and/or risk associated with the BC score 80C being displayed. Referring to the example user interfaces 90Q, 90R shown in FIGS. 21 and 22, the breach event 70 described in FIG. 21 as "Lighthouse Management Services" has an overall BC score of 7.3 indicated in the red circular icon positioned near the right end (as shown on the page) of the graphic BC scale 122B, and the breach event 70 described in FIG. 22 as "Tarte Cosmetics" has an overall BC score of 1.5 indicated in the yellow circular icon positioned near the left end (as shown on the page) of the graphic BC scale 122B, such that it would be understood that the risk of harm from the "Tarte Cosmetics" breach event 70 is assessed as relatively lower than the risk of harm from the "Lighthouse Management Services" breach event 70.

At step 110, the BC algorithm 10, using the element risk scores 74 of the breached information elements 68, determines recommended consumer action steps, including, for example, mitigation actions 116, as illustrated by the examples shown in FIG. 8 and FIGS. 15-23. The consumer action steps and/or mitigation actions 116 are based on information which may be stored in the BC data structure 22, including, for example, the results of research interviews, qualitative and quantitative input, and/or surveys of impartial industry experts working in the field of identity-related consumer harms protection.

Figure 23:
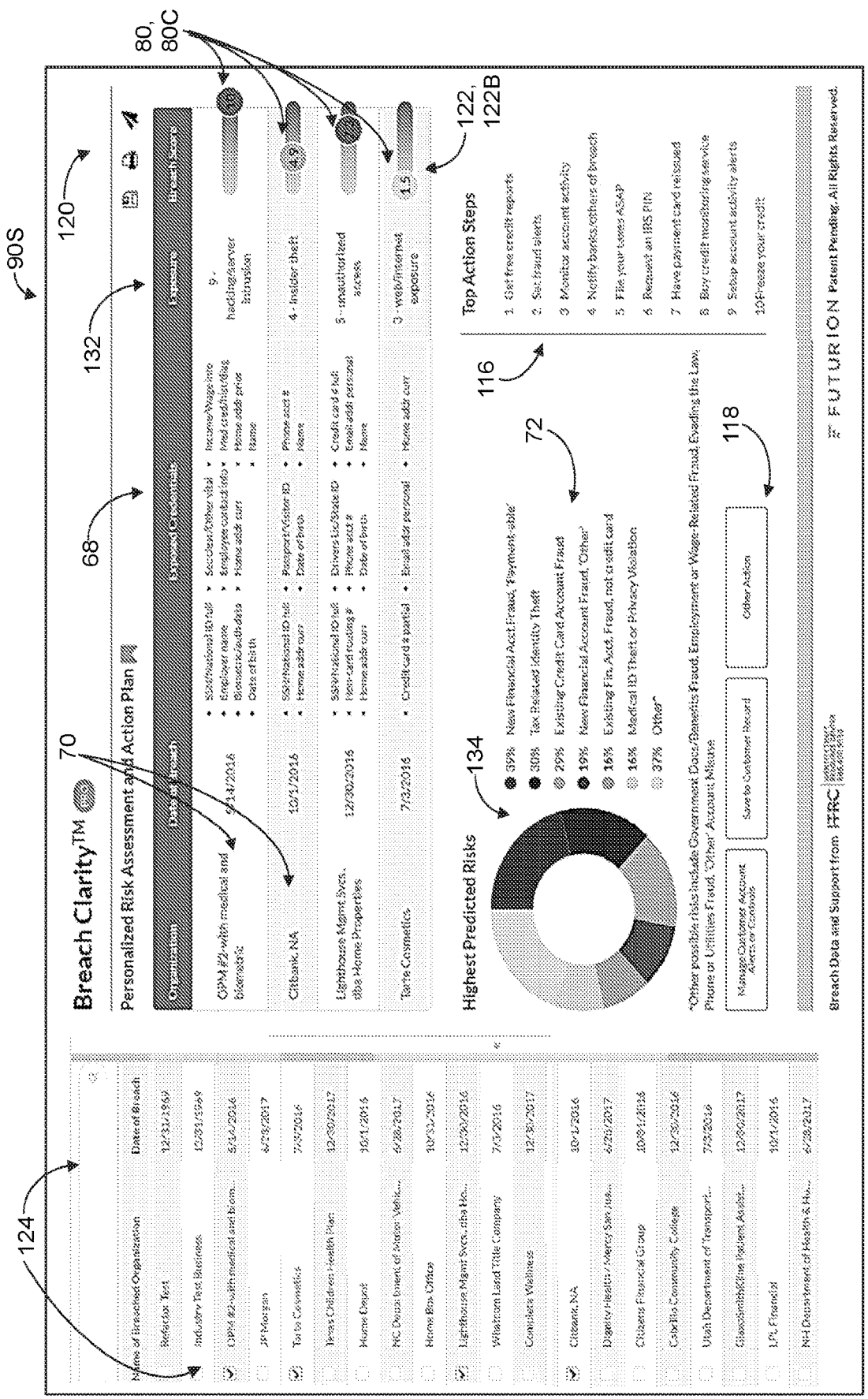
FIG. 23 is a schematic illustration of an exemplary user interface displaying the consolidated risk outputs of the plurality of breach events shown in FIGS. 19 through 22.

At step 112, the BC server 12 outputs the risk-outputs generated by the BC algorithms 10 and/or BC applications 20 to the consumer-victim, via a user interface 90 configured by the BC system 100. In one example, the user interface 90C shown in FIG. 8 is displayed to the consumer-victim via the input/output interface 128 of the user device 30. As illustrated by the examples shown in FIG. 8 and FIGS. 15-23, the BC risk-outputs are displayed such that the breach event name 70, the listing of risks and harms 72 in rank order beginning with the harms 72 for which the highest harm risk score 76 has been determined, the BC score 80, displayed as a relative BC score 80B both numerically and on a graphical BC scale 122, and a listing of mitigation actions 116 determined to have the relatively greatest potential to mitigate the identified harms 72 are all viewable in a summary format by the consumer-victim to provide a comprehensive overview of the breach event 70 as it affects the consumer-victim. The example shown in FIG. 23 illustrates an example user interface 90S which can be generated for a consumer-victim who has been victimized by a plurality of breach events 70, where in this example, the individual BC scores 80 and exposure ratings 132 are shown for each of the breach events 70, as previously shown for each of the individual breach user interfaces for these breach events 70 in FIGS. 19-22. As contrasted to FIGS. 19-22, in the summary user interface 90S shown in FIG. 23, the predicted risks 72 identified for the individual breach events 70 have been consolidated using an algorithm 10 into a consolidated risk distribution 134, and the top action steps 116 have been consolidated using an algorithm 10 into a consolidated prioritized, e.g., rank ordered listing of mitigation actions 116 recommended for action by the consumer victim. The algorithms 10 used to generate the consolidated risk distribution 134 and/or the consolidated listing of ranked mitigation actions 116 can include, for example, operands, modifiers, and/or other weighting factors which account for the frequency of exposure of the breached information elements 68 through the multiple breach events 70 experienced by the consumer-victim, the exposure ratings 132 of the multiple breach events 70, demographic and/or behavioral characteristics of the consumer-victim stored in a subscriber-consumer BC risk profile in the data structure 22 and/or otherwise received by the BC server 12, etc. The summary BC user interface 90S provides the consumer-victim who has been victimized by multiple breach events 70 with a consolidated risk assessment including BC risk outputs which have been ranked, quantified, and/or otherwise prioritized for that consumer-victim's individualized situation, thus advantageously focusing the consumer on the top ranked, e.g., most effective mitigation actions 116 to be taken to reduce the consumer's risk of harm across the total of the multiple breach events 70 experienced by the consumer.

In a non-limiting example, the user interface 90 can include one or more graphical user interfaces (GUI) which can be used by the consumer-victim to interact with the user interface 90 to view information related to the breach event 70 and/or the BC risk-outputs, and/or to action mitigation steps 116. By way of non-limiting example, the user interfaces 90, including 90a through 90S, can include one or more of graphical user interfaces 118, 120, 122, 124, 132, 134, as described in further detail herein. The term "graphical user interface" or "GUI" is to be construed broadly and can include, for example, one or more of graphical icons, links, buttons, switches, input fields, widgets, menus, lists, text windows, dialog boxes, etc. The consumer-victim can actuate the GUI, for example, via an input to the GUI provided by a touch applied to a touch screen displaying the user interface 90, an input from a keyboard, which may be a virtual keyboard displayed on the input/output interface 128, an input from a pointing device such as a mouse, pointing stick, a voice input, etc. In an illustrative example shown in FIG. 8, the user interface 90C can include multiple GUIs. As shown in the examples in FIGS. 8, 9, 12-14 and 23, a user can input a breach descriptor 70 into an input field 124, to search for a breach event, or a plurality of breach events. By way of non-limiting example, the input field 124 can be a search field, can include a drop-down menu, be linked to a pop-up screen listing breach events 70 including in the BC data structure 22, etc. In the example shown in FIG. 8, a user input to the field displaying the breach descriptor 70E, "ACME Data Breach", can actuate the user interface 90C to display additional information about the breach event 70E, the ACME data breach. The additional information can be displayed, for example, in a pop-up window or by expanding the breach event field in the user interface 90C. Additional breach information can include, for example, the date(s) of the breach, the number of consumers affected by the breach, information (if known) about the breaching organization, a listing of the information elements 68 compromised by the breach event 68, contact information for the breached entity (in the current example, ACME), etc.

For example, a user input to a GUI associated with the field displaying "Your Highest Risks" can actuate the user interface 90C to display additional information about the list of harms 72, for example, by expanding the window to show the entire list of potential harms 72 associated with the ACME breach event 70E by the BC system 100. In one example, a field for a particular harm 72, such as "Tax Fraud" can be actuated by the consumer such that the user interface 90C displays additional information associated with the "Tax Fraud" harm 72A which can include a description of the particular harm 72A, the harm risk score 76 assigned to the particular harm 72A by the BC algorithm 10, mitigation actions 116 recommended for the particular harm 72A, etc.

For example, a user input to a GUI associated with the field displaying "Your To Do List" (see FIG. 8) or the field displaying "Top Action Steps" (see FIGS. 15-23) can actuate the user interface 90 to display additional information about the list of mitigation actions 116, for example, by expanding the window to show the entire list of mitigation actions 116 recommended to the consumer-victim of the ACME breach event 70E by the BC system 100. In one example, a field for a particular "to do" item, such as the field listing mitigation action 116 "Set fraud alerts through a credit bureau" can be configured as a touch input actuatable, for example, by touch input of the consumer such that the user interface 90C displays additional information associated with the "Set fraud alerts through a credit bureau" mitigation action 116, which can include an explanation of the mitigation action 116, the expected benefits and/or mitigating effect of completing the action, etc., the particular harms 72 which are potentially mitigated by completing the particular action "Set fraud alerts through a credit bureau", a listing of resource entities, for this example a listing of credit bureaus through which a fraud alert can be set, etc. and/or can open a link to a resource provider and/or a resource server 50 such that the consumer can immediately initiate the mitigation action 116 upon viewing the BC outputs for the breach event 70. For example, the user interface 90C can be configured such that the consumer can initiate a particular mitigation action 116 via the user interface 90C, for example, by connecting through the user interface 90C to a resource interface 48 (see FIG. 1) configured to provide the particular mitigation action 116. In the present example, the user interface 90C can be configured such that, when the consumer actuates the GUI associated with the mitigation action 116 displayed as "Set fraud alerts through a credit bureau", an actuatable link to one or more credit bureaus (resource entities) can be displayed to the consumer. Selecting the link to one of the credit bureaus can direct the consumer to the credit bureau's online interface 48, such that the consumer can immediately take steps to complete the mitigation action 116 "Set fraud alerts through a credit bureau".

The user interfaces 90, in the examples shown, can be actuated by the consumer to export at least a portion of the BC breach information by consumer actuation of the "Export" icon 120 in the present illustration. In the example user interface 90C shown in FIG. 8, the BC application 20 is configured to export the "to-dos" from the listing of mitigation actions 116 to a calendar application when the Export icon 120 is actuated, for follow-up by the consumer. In another example, the BC application 20 is configured to generate and display a menu listing when the "Export" icon 120 is actuated. The menu listing can include one or more of the breach event name 70, the BC score 80, the listing of harms 72, and the to-do list including mitigation actions 116, such that the consumer can select which items of breach information, risk-outputs and/or actions the consumer would like exported by the BC application 20 to an export format which may be selected by the consumer, where the export format may be, for example, a downloadable file, a printable version of the user interface 90C, calendar entries, etc. Additional examples of export icons 120 are shown in FIGS. 15-23.

Figure 12:
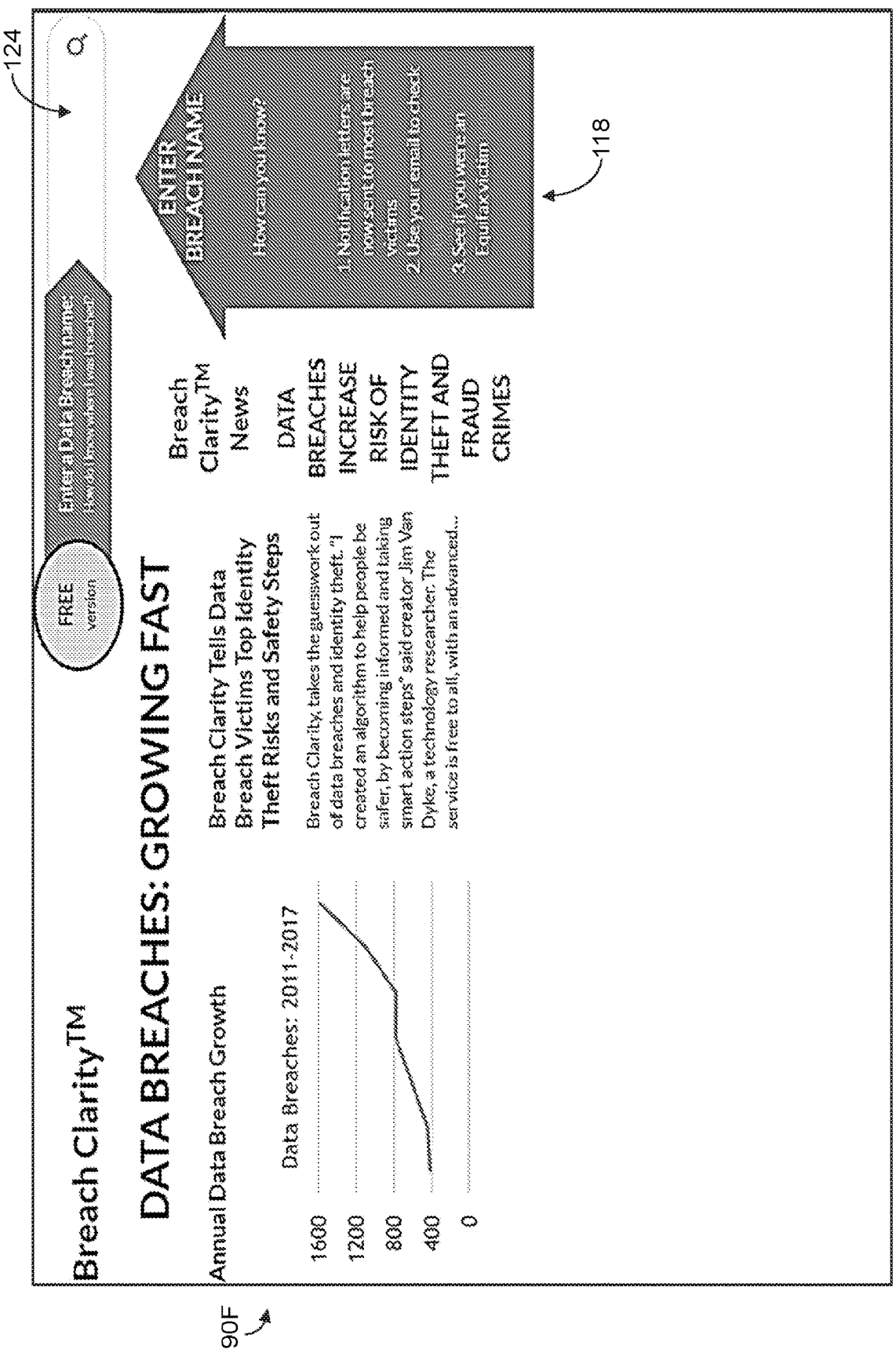
FIG. 12 is a schematic illustration of an exemplary user interface for accessing the BC system of FIG. 1.
Figure 13:
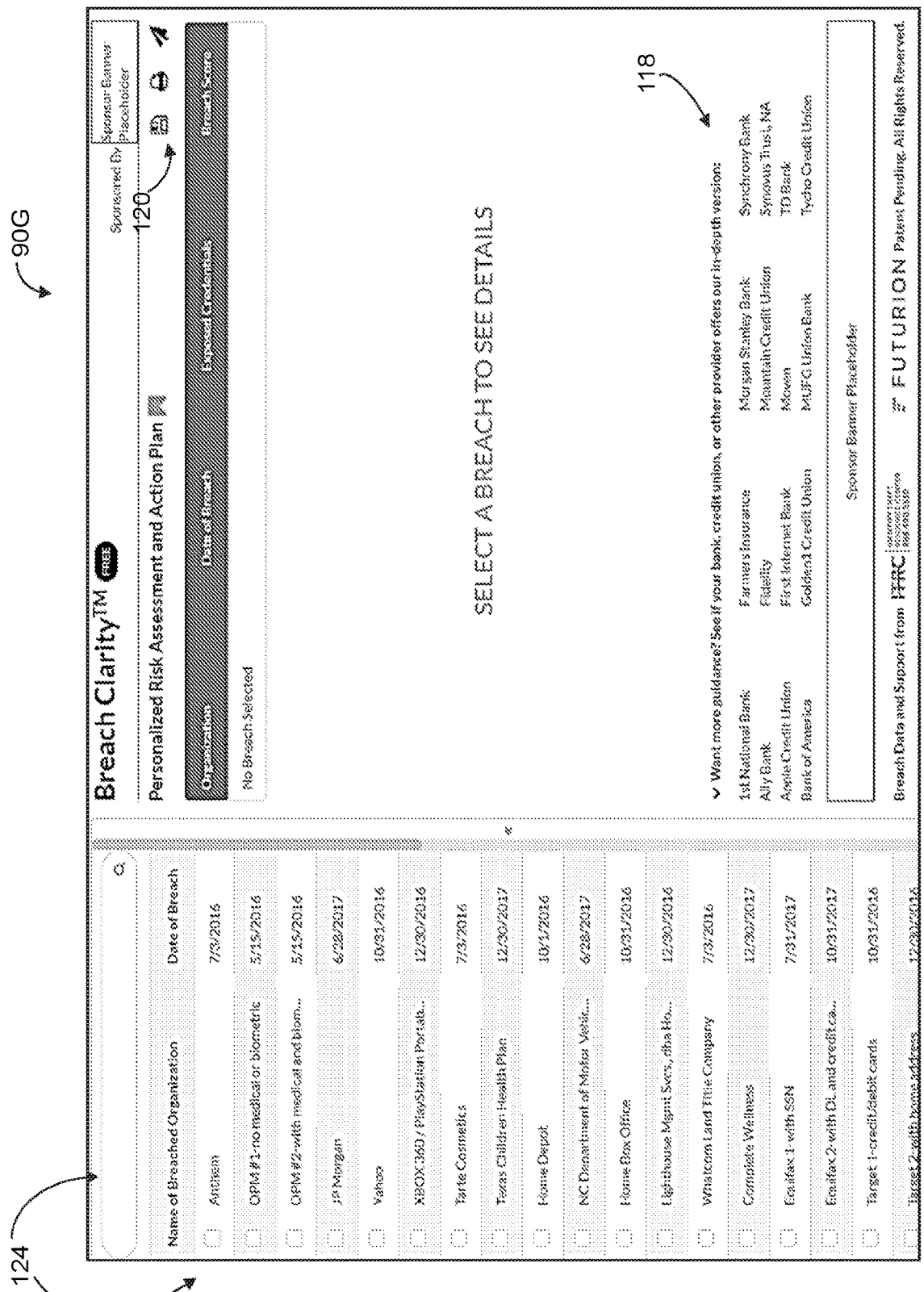
FIG. 13 is a schematic illustration of another exemplary user interface for accessing the BC system of FIG. 1.
Figure 14:
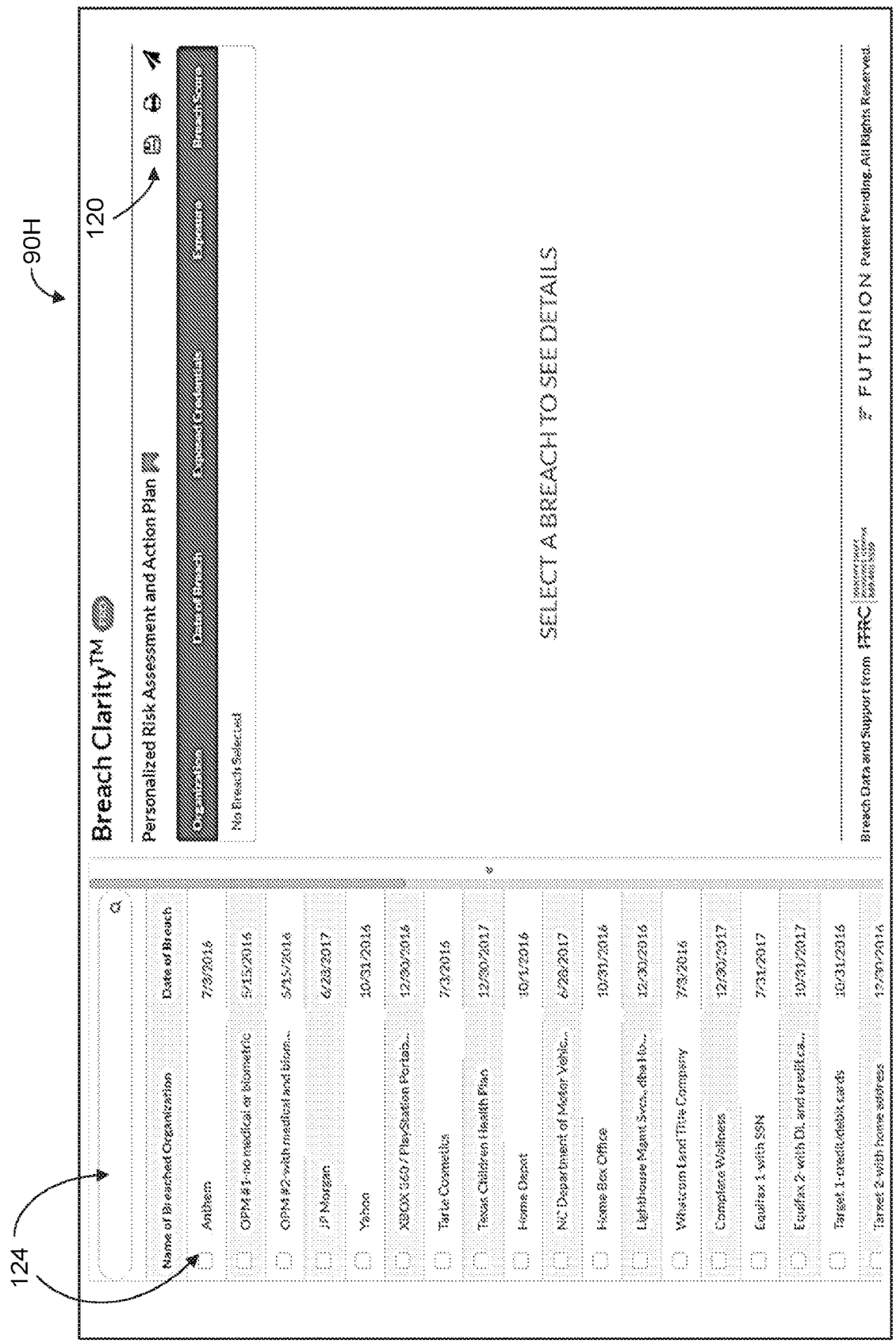
FIG. 14 is a schematic illustration of another exemplary user interface for accessing the BC system of FIG. 1.
Figure 15:
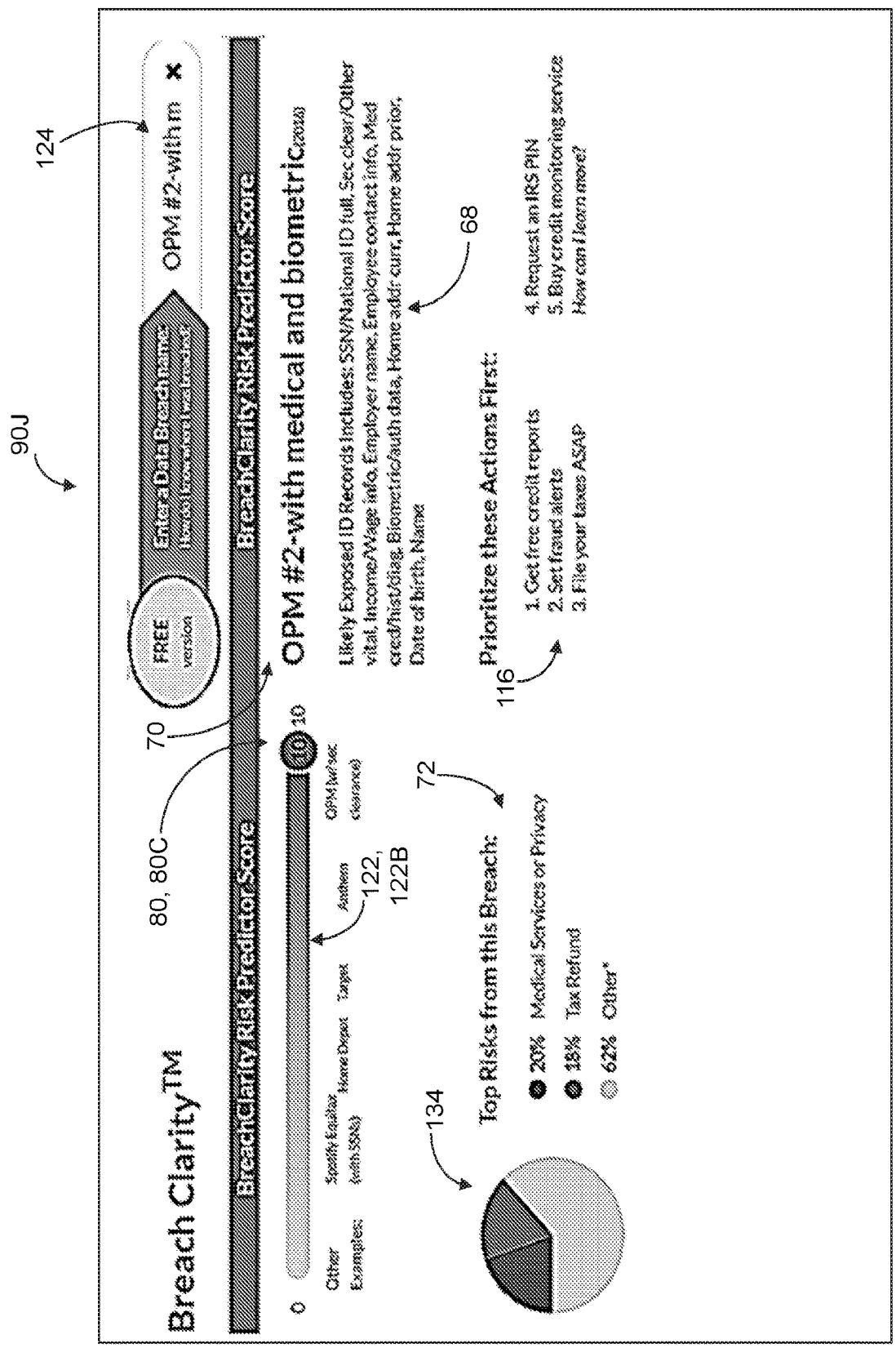
FIG. 15 is a schematic illustration of an exemplary user interface displaying the risk outputs for a first example breach event accessed via the user interface of FIG. 12.
Figure 16:
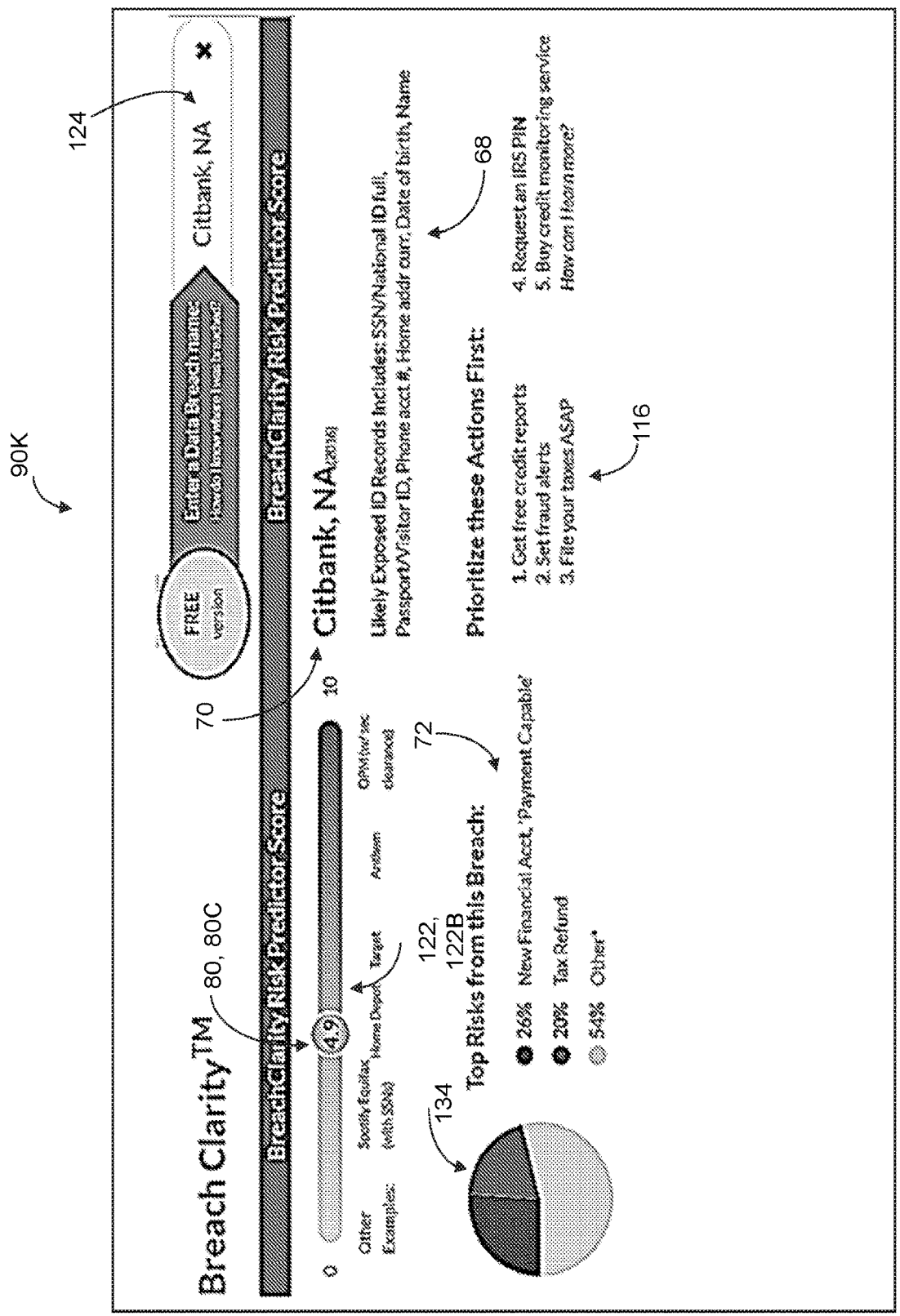
FIG. 16 is a schematic illustration of an exemplary user interface displaying the risk outputs for a second example breach event accessed via the user interface of FIG. 12.
Figure 17:
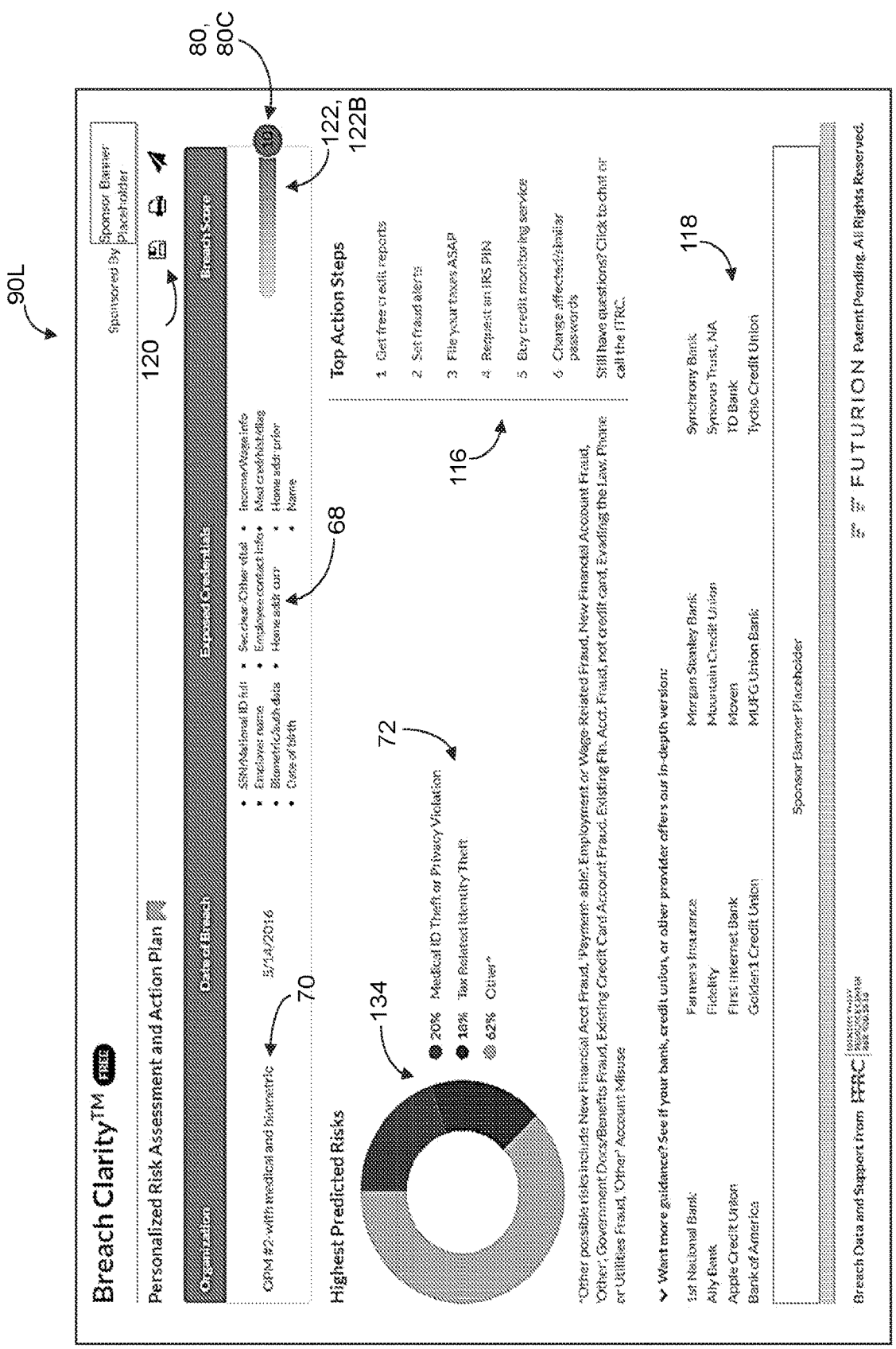
FIG. 17 is a schematic illustration of an exemplary user interface displaying the risk outputs for the first example breach event accessed via the user interface of FIG. 13.
Figure 18:
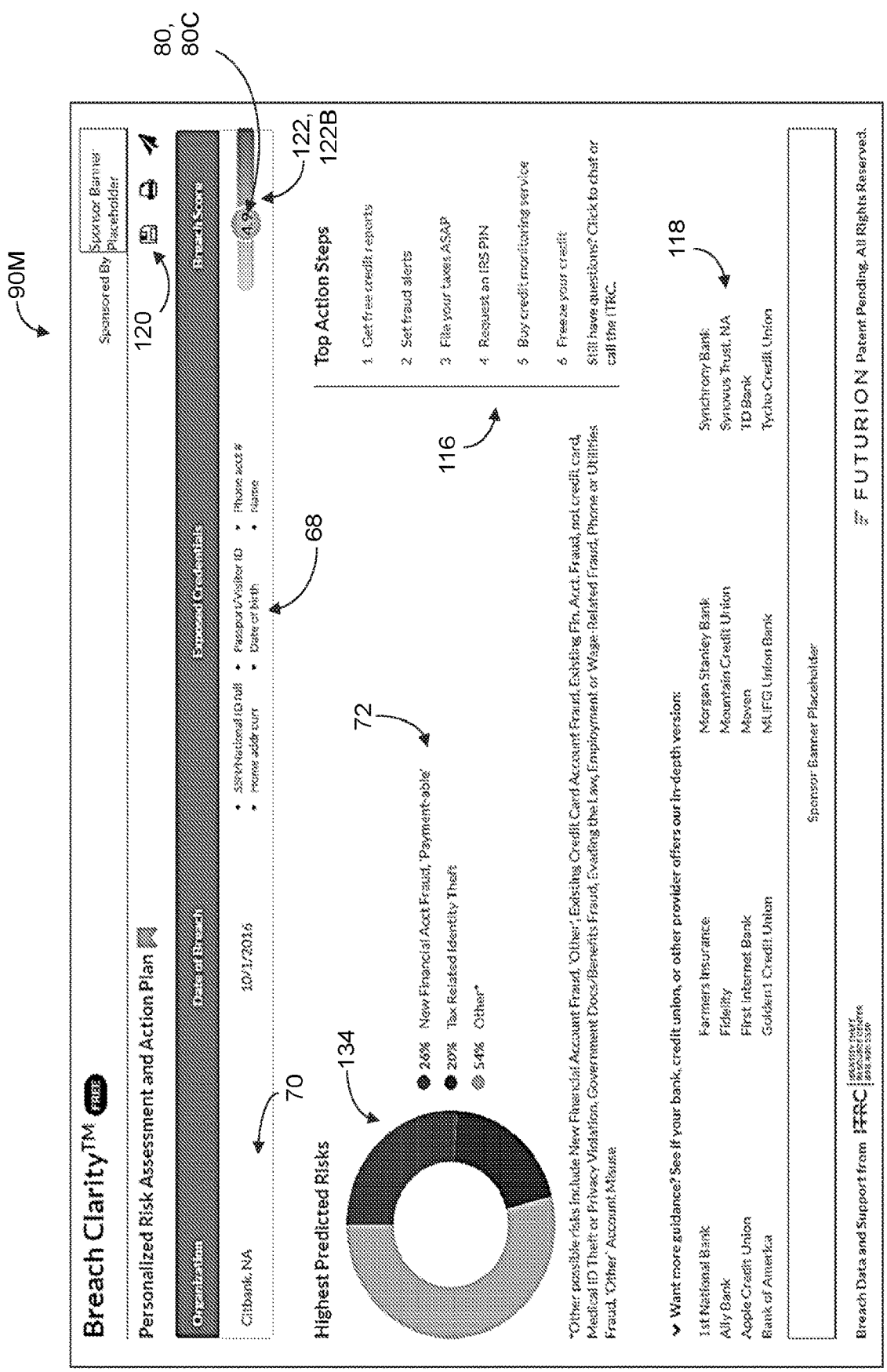
FIG. 18 is a schematic illustration of an exemplary user interface displaying the risk outputs for the second example breach event accessed via the user interface of FIG. 13.
Figure 19:
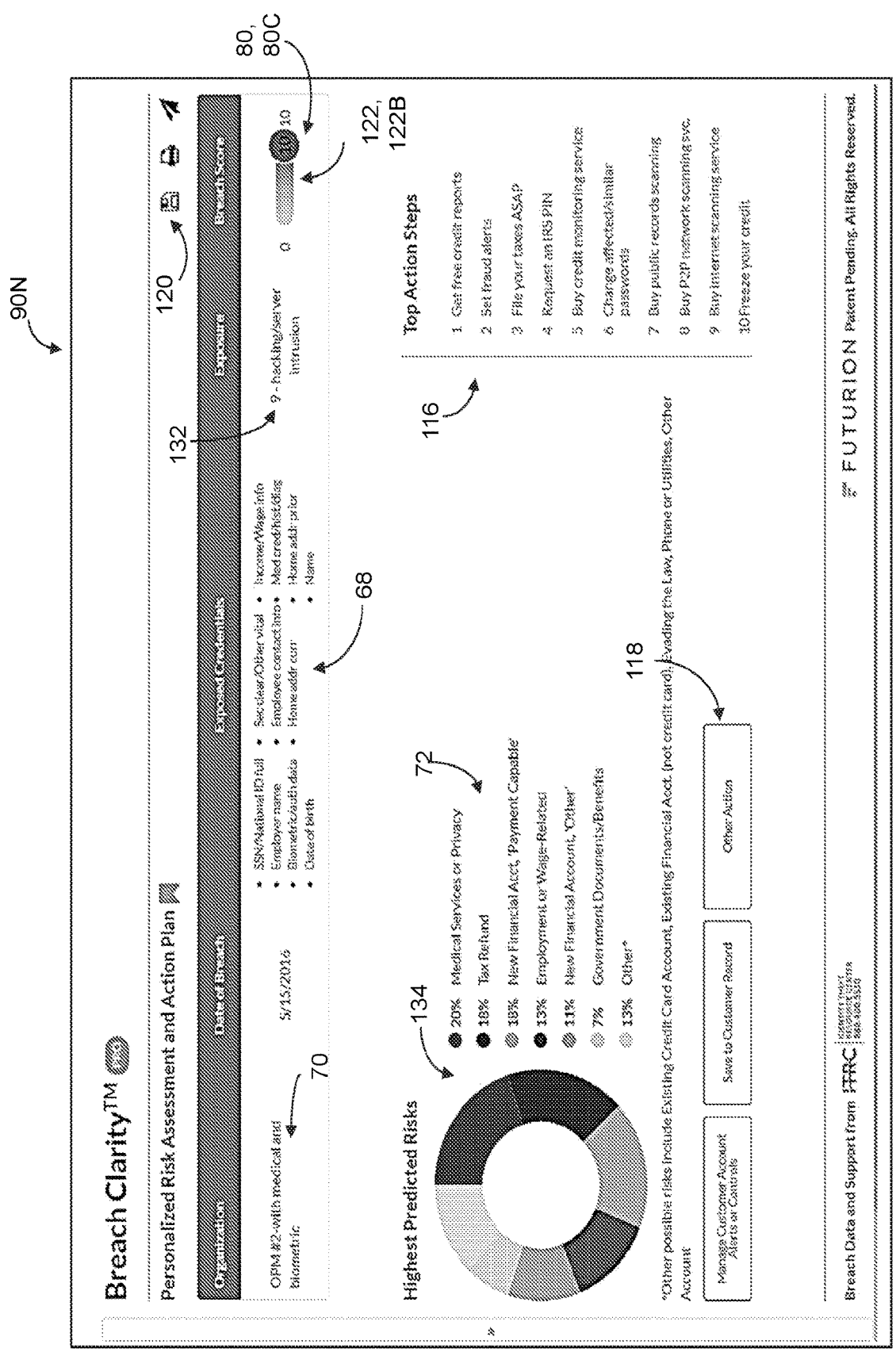
FIG. 19 is a schematic illustration of an exemplary user interface displaying the risk outputs for the first example breach event accessed via the user interface of FIG. 14.
Figure 20:
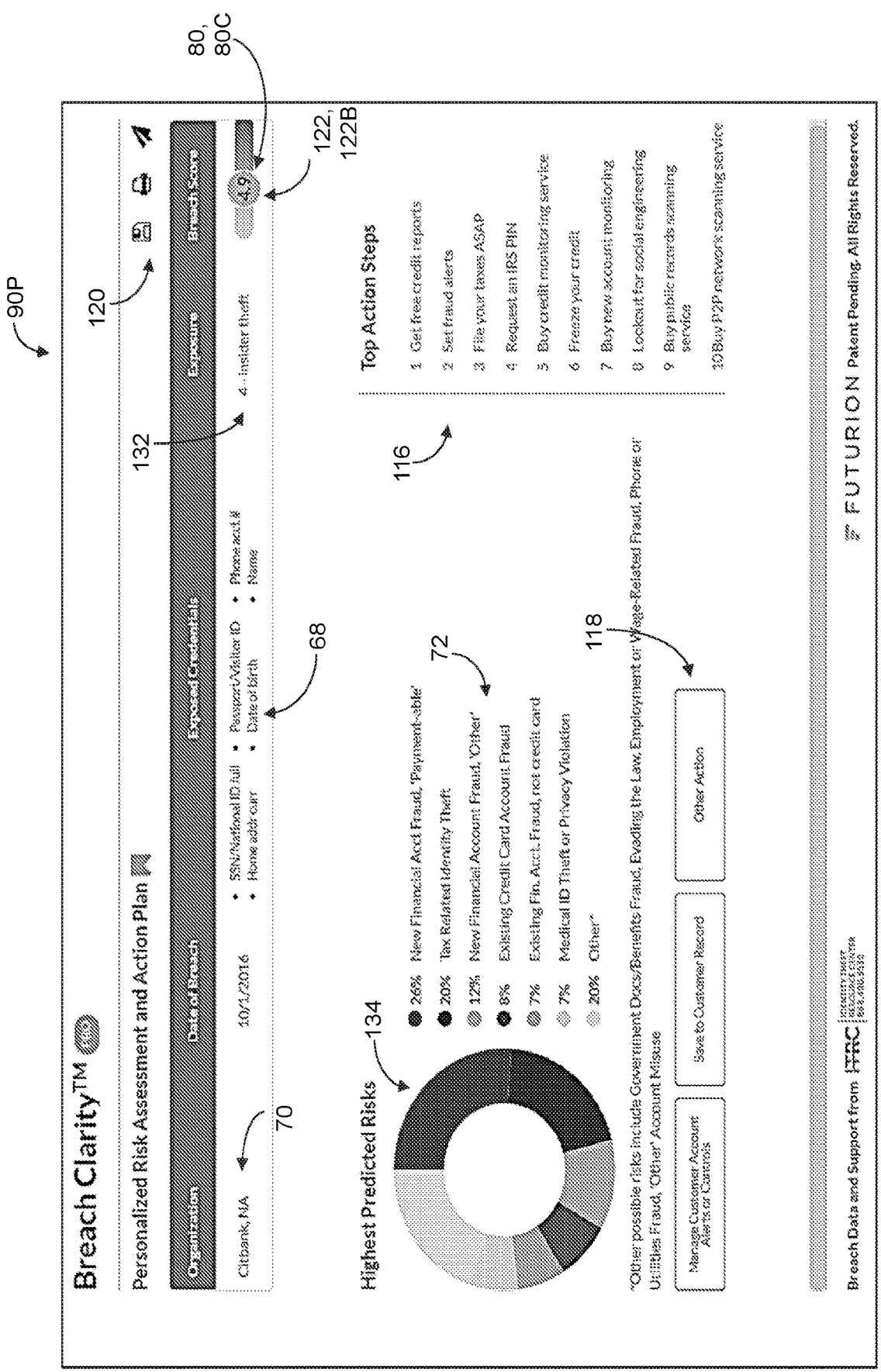
FIG. 20 is a schematic illustration of an exemplary user interface displaying the risk outputs for the second example breach event accessed via the user interface of FIG. 14.
Figure 21:
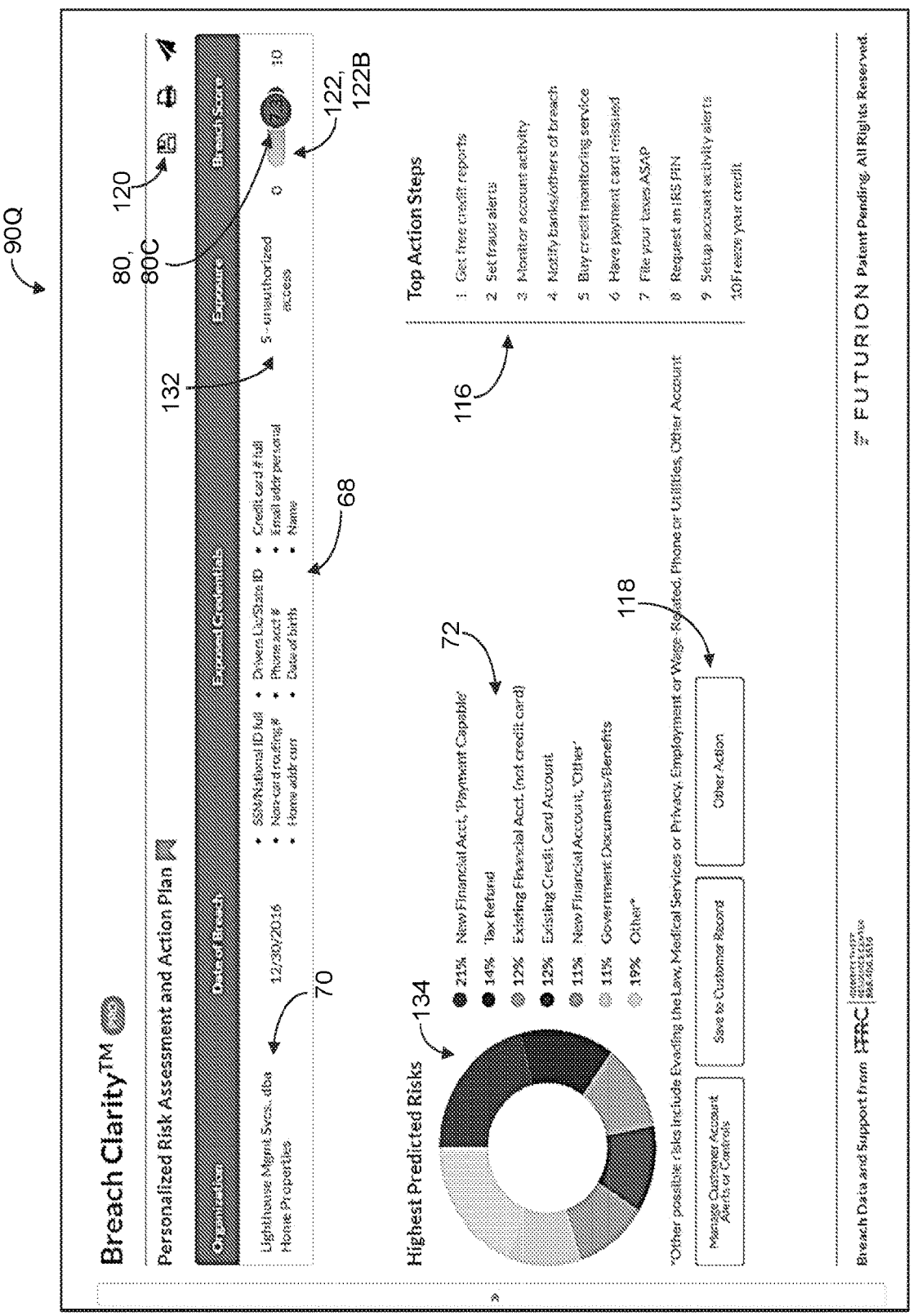
FIG. 21 is a schematic illustration of an exemplary user interface displaying the risk outputs for a third example breach event accessed via the user interface of FIG. 14.
Figure 22:
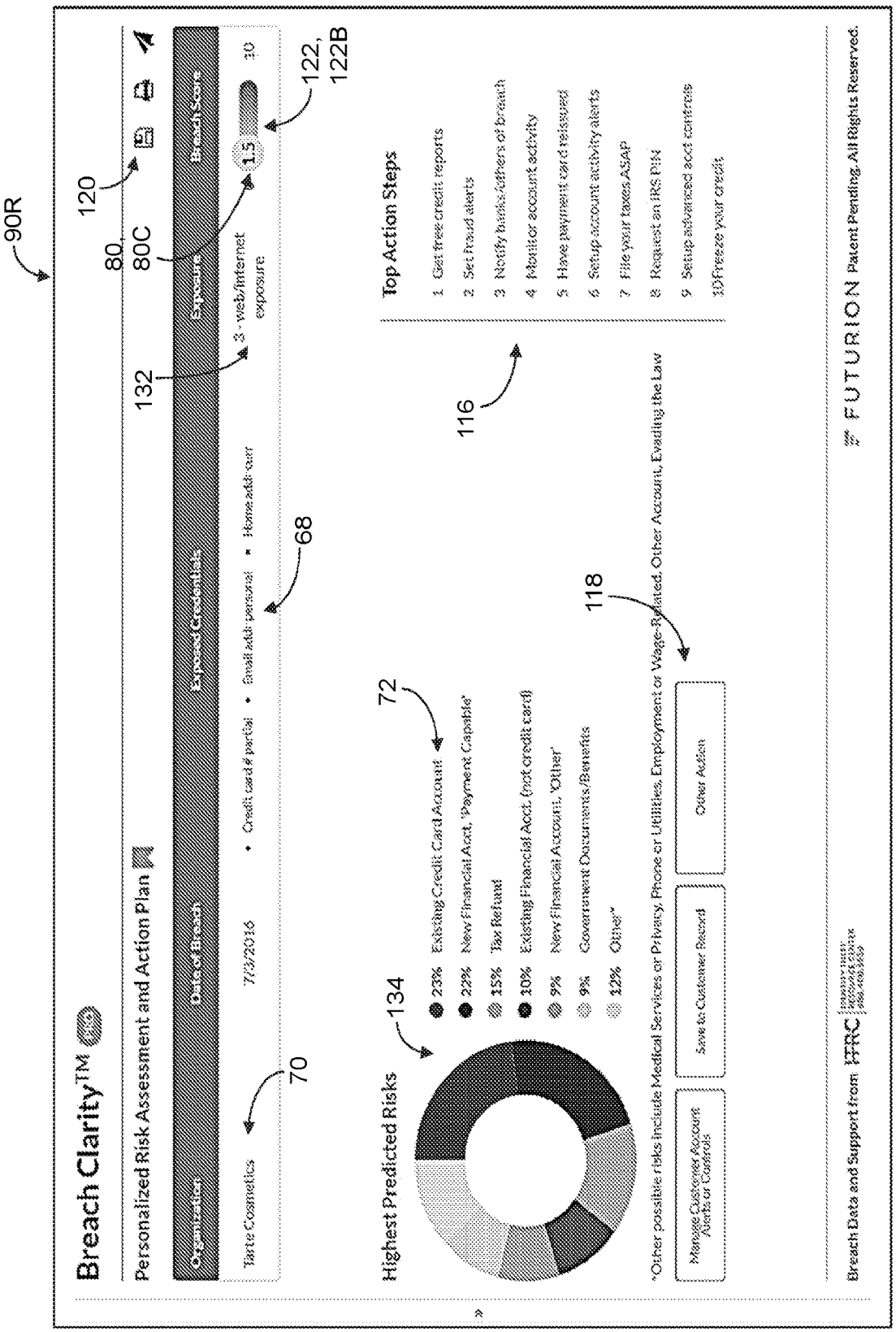
FIG. 22 is a schematic illustration of an exemplary user interface displaying the risk outputs for a fourth example breach event accessed via the user interface of FIG. 14.

FIGS. 12-14 illustrate non-limiting examples of user interfaces 90F, 90G, 90H through which a consumer can access the BC system 100 and BC risk outputs previously described herein. The example shown in FIG. 12 illustrates a BC interface 90F which can used to provide introductory information to a consumer, which can include a breach input field 124 for entering the name of a breach to be searched, or to actuate a drop-down menu of breach events 70 for which breach information can be retrieved from the BC system 100. The BC user interface 90F can include one or more actuatable links 118 for connecting the consumer to third-party resources, including, for example, reporting servers 40 and/or resource servers 50, from which the consumer can obtain additional breach information. In an illustrative example, the BC user interface shown in FIG. 13 can include GUI links 118 to third-party providers such as financial or health institutions which may offer subscription and/or sponsored access to the BC system 100 for consumers affiliated with the sponsoring institution, such as bank clients and/or health system participants, as a service to increase awareness of breach risks and mitigation actions 116.

FIGS. 15-23 provided as illustrative examples of user interfaces 90G, 90H, 90J, 90K, 90L, 90M, 90N, 90P, 90Q, 90R, and 90S which can be generated by the BC server 12 and outputted on a user device 30 for display to and/or access by a consumer-victim, including the BC risk outputs previously described herein. As shown in FIGS. 15-23, the BC risk outputs can include, for example, a breach event descriptor 70, a Breach Clarity™ score 80 shown numerically and/or graphically 80C, a listing of the information elements 68 exposed by the breach event 70, a listing of harms and/or risks 72 which can also be shown as a risk distribution graphic 134 which in the illustrative examples is a pie chart or segmented annular (doughnut) chart, a listing of mitigation actions 116 which are rank ordered for effectiveness in protecting the consumer from harm, an exposure rating 132 based on the type and/or nature of the breach event 70 (hacking, unauthorized access, theft, internet exposure, etc.), and one or more GUIs or links which can be actuated by the consumer via the user device 30 to access affiliated sites, web pages, resources, third-party providers, etc., including for example, one or more reporting and/or resource servers 40, 50.

The examples provided herein are non-limiting. For example, the algorithms 10 described herein are illustrative and can include additional factors, operands and/or operators gleaned from the quantitative research which has been conducted in the development of the data breach system 100. For example, a BC algorithm 10 can be configured to include a persistence factor for each information element 68, where the persistence factor quantifies the persistence of the value of a particular information element 68, e.g., the likelihood that the value of the particular information element 68 remains constant over time. For example, an information element 68 such as a social security number, which typically remains the same for the life of the consumer, has a relatively high persistence. In contrast, an information element 68 such as a payment card number, which can be changed regularly, has a relatively low persistence. The data structure 22 will be populated with additional information from future data breach events and the quantitative research will continue to be conducted such that the algorithms 10 should be considered to be dynamic, e.g., the method described herein includes periodically revising the algorithms 10 based on new and additional information gleaned from the quantitative research and new information related to breach events and the harms associated with those events. For example, an element risk score 72 associated with a particular information element-harm pair in the data structure 22 can be modified as additional information is made available from reporting entities and/or resource entities regarding the availability of the breached information elements and/or regarding actions taken by the breached entity to contain harms associated with their breach event, government identify protection actions, criminal enforcement efforts to reduce the availability of the breached information, etc.

The detailed description and the drawings or figures are supportive and descriptive of the disclosure, but the scope of the disclosure is defined solely by the claims While some of the best modes and other embodiments for carrying out the claimed disclosure have been described in detail, various alternative designs and embodiments exist for practicing the disclosure defined in the appended claims Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims

The invention claimed is:

1. A method for determining a consumer's risk of harm resulting from a data breach of the consumer's information, the method comprising:
  populating, via a server, a data structure with breach information;
  wherein the breach information includes:
    a plurality of consumer information elements; and
    a plurality of consumer harms;
  wherein each consumer harm is characterized as a harm experienced by a consumer which results from a breach of at least one consumer information element;
  wherein each consumer information element of the plurality of consumer information elements is paired with each consumer harm of the plurality of consumer harms to generate a plurality of information element-harm data pairs;
  generating, using an algorithm, an element risk score for each respective information element-harm pair of the plurality of information element-harm data pairs;
  associating, in the data structure, the element risk score with the respective information element-harm data pair;
  wherein the breach information further includes:
    a breach event descriptor, wherein the breach descriptor identifies an occurrence of a breach event during which at least one consumer information element is compromised; and
    at least one breached information element, wherein the at least one breached information element includes the at least one consumer information element of the plurality of consumer information elements which has been compromised by the breach event;

the method further comprising:
  receiving, via the server, the breach event descriptor and the at least one breached information element;
  associating, in a further data structure, the breach event descriptor with the at least one breached information element; and
  associating, using the data structures, each information element-harm pair of the plurality of information element-harm data pairs which includes the at least one breached information element with the breach event descriptor.

2. The method of claim 1, further comprising:
generating, using the algorithm, an exposure rating for the breach event; and
associating, in the data structure, the exposure rating with the breach event descriptor:
wherein the exposure rating corresponds to a likelihood of exposure of the breached information element.

3. The method of claim 1, further comprising:
generating, using the algorithm, a harm risk score for the respective consumer harm of each information element-harm data pair associated with the breach event descriptor;
associating, using the data structure, the harm risk score for each consumer harm with the breach event descriptor; and
storing in the data structure the harm risk score associated with the breach event descriptor.

4. The method of claim 3, wherein generating the harm risk score includes summing the element risk scores of the respective information element-harm data pairs including the respective harm.

5. The method of claim 3, further comprising:
generating, using the algorithm, a data breach score for the breach event; and
wherein generating the data breach score includes summing the harm risk scores of the respective consumer harms of each information element-harm data pair associated with the breach event descriptor to generate the data breach score.

6. The method of claim 5, wherein the data breach score is calculated by the algorithm as an absolute value.

7. The method of claim 5, wherein the data breach score is calculated by the algorithm as a relative value.

8. The method of claim 7, further comprising:
generating the relative value, using the algorithm, by applying at least one of a scaling factor and a modifier to the data breach score.

9. The method of claim 5, further comprising:
outputting, via the server, the data breach score to a user interface; wherein the user interface is in communication with the server; and
wherein the user interface is configured to be accessible by a consumer owner of the breached information element.

10. The method of claim 9, further comprising:
generating, using the algorithm, at least one mitigation action for mitigating the at least one consumer harm associated with the breach event descriptor; and
outputting the at least one consumer harm and the at least one mitigation action to the user interface.

11. The method of claim 10, further comprising:
associating, in the data structure, the at least one mitigation action with the at least one consumer harm to form a harm-mitigation action data pair;
determining, using the algorithm, a prioritization factor for the harm-mitigation action data pair.

12. The method of claim 11, wherein the at least one mitigation action includes a plurality of mitigation actions;
determining, using the algorithm, a respective prioritization factor for each respective mitigation action of the plurality of mitigation actions; and
associating, in the data structure, the respective prioritization factor with each respective mitigation action.

13. The method of claim 12, further comprising:
compiling, using the algorithm, a listing of the plurality of mitigation actions;
wherein each respective mitigation action is ordered in the listing according to the respective prioritization factor associated with the respective mitigation action.

14. The method of claim 10, further comprising:
associating, in the data structure, the user interface with the at least one mitigation action;
wherein the user interface is configured to be actuatable by the consumer owner to initiate the at least one mitigation action.

15. An apparatus for determining a consumer's risk of harm resulting from a data breach of the consumer's information, the apparatus comprising a computing device having a processor and a non-transitory memory, the non-transitory memory storing instructions executable by the processor such that the apparatus is configured to:
  populate a data structure with breach information;
  wherein the breach information includes:
    a plurality of consumer information elements; and
    a plurality of consumer harms;
  wherein each consumer harm is characterized as a harm experienced by a consumer which results from a breach of at least one consumer information element;
  wherein each consumer information element of the plurality of consumer information elements is paired with each consumer harm of the plurality of consumer harms to generate a plurality of information element-harm data pairs;
  generate, using an algorithm, an element risk score for each respective information element-harm pair of the plurality of information element-harm data pairs; and
  associate, in the data structure, the element risk score with the respective information element-harm data pair;
  wherein the breach information further includes:
    a breach event descriptor, wherein the breach descriptor identifies a breach event; and
    at least one breached information element, wherein the at least one breached information element is a respective consumer information element of the plurality of consumer information elements which has been compromised by the breach event;
  wherein the apparatus is further configured to:
    receive the breach event descriptor and the at least one breached information element;
    associate, in a further data structure, the breach event descriptor with the at least one breached information element; and
    associate, using the data structures, each information element-harm pair of the plurality of information element-harm data pairs which includes the at least one breached information element with the breach event descriptor.

16. The apparatus of claim 15, further configured to:
generate, using the algorithm, a harm risk score for the respective consumer harm of each information element-harm data pair associated with the breach event descriptor;

associate, using the data structure, the harm risk score for each consumer harm with the breach event descriptor; and store in the data structure the harm risk score associated with the breach event descriptor.

17. The apparatus of claim 16, further configured to:

generating, using the algorithm, a data breach score for the breach event; and wherein generating the data breach score includes summing the harm risk scores of the respective consumer harms of each information element-harm data pair associated with the breach event descriptor to generate the data breach score.

18. The apparatus of claim 15, further configured to:

generate, using the algorithm, an exposure rating for the breach event; and associate, in the data structure, the exposure rating with the breach event descriptor.

\* \* \* \* \*